(12) United States Patent
Kikuchi et al.

(10) Patent No.: US 9,079,502 B2
(45) Date of Patent: Jul. 14, 2015

(54) ELECTRICALLY DRIVEN VEHICLE

(75) Inventors: Akira Kikuchi, Hitachi (JP); Tomohiko Yasuda, Kashiwa (JP); Takayuki Sato, Kashiwa (JP); Kichio Nakajima, Kasumigaura (JP); Hiroyuki Kobayashi, Hitachi (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 13/883,819

(22) PCT Filed: Nov. 9, 2011

(86) PCT No.: PCT/JP2011/075871
§ 371 (c)(1),
(2), (4) Date: May 13, 2013

(87) PCT Pub. No.: WO2012/067000
PCT Pub. Date: May 24, 2012

(65) Prior Publication Data
US 2013/0226388 A1    Aug. 29, 2013

(30) Foreign Application Priority Data
Nov. 15, 2010    (JP) .................................. 2010-254817

(51) Int. Cl.
*B60L 3/10* (2006.01)
*B60L 15/20* (2006.01)
*B60W 10/08* (2006.01)
*B60W 30/02* (2012.01)

(52) U.S. Cl.
CPC ................. *B60L 3/106* (2013.01); *B60L 3/102* (2013.01); *B60L 15/20* (2013.01); *B60L 3/10* (2013.01);
(Continued)

(58) Field of Classification Search
CPC ..... B60W 20/00; B60W 10/02; B60W 30/00; B60W 2710/083; B60L 2240/423; B60L 2240/443; B60K 6/445; F02D 29/02; Y02T 10/6239; B62M 6/45; B60T 7/042; B60T 8/18
See application file for complete search history.

(56) References Cited

U.S. PATENT DOCUMENTS 5,070,961 A * 12/1991 Tezuka .......................... 180/249
5,419,624 A *  5/1995 Adler et al. ................... 303/112
(Continued)

FOREIGN PATENT DOCUMENTS

JP    2-299402    12/1990
JP    2003-88152    3/2003
(Continued)

OTHER PUBLICATIONS

PCT International Preliminary Report on Patentability, International Application No. PCT/JP2011/075871, mailed May 30, 2013.

*Primary Examiner* — James Trammell
*Assistant Examiner* — Demetra Smith-Stewart
(74) *Attorney, Agent, or Firm* — Baker Botts L.L.P.

(57) ABSTRACT

Provided is an electrically driven vehicle that is capable of suppressing drive wheel slippage without increasing the pitching vibration of the vehicle. The electrically driven vehicle having electric motors (1, 4), drive wheels (3, 6) driven by the electric motors respectively, and, when at least one of the drive wheels slips, an electric motor control device (40) for reducing the torque of at least one of the electric motors that drives the at least one wheel slipped, and for restoring the torque of the at least one electric motor when the slippage is stopped includes a pitching detection device (26) for detecting the amplitude of pitching vibration to which the vehicle is subjected. The amount of torque of the at least one electric motor to be restored by the electric motor control device over a predetermined period of time after the slippage is stopped varies depending on whether or not the amplitude A detected by the pitching detection device is greater than an assessment value A1.

7 Claims, 15 Drawing Sheets

(52) U.S. Cl.
CPC .......... *B60L 2220/46* (2013.01); *B60L 2240/24* (2013.01); *B60L 2240/421* (2013.01); *B60L 2240/423* (2013.01); *B60L 2240/429* (2013.01); *B60L 2240/46* (2013.01); *B60L 2240/461* (2013.01); *B60L 2240/463* (2013.01); *B60L 2240/465* (2013.01); *B60L 2270/145* (2013.01); *Y02T 10/648* (2013.01); *Y02T 10/7275* (2013.01)

(56) References Cited

U.S. PATENT DOCUMENTS

| | | | |
|---|---|---|---|
| 6,804,599 B1 * | 10/2004 | Burnett | 701/76 |
| 8,116,939 B2 * | 2/2012 | Kajino et al. | 701/38 |
| 8,340,864 B2 * | 12/2012 | Itabashi et al. | 701/37 |
| 8,862,300 B2 * | 10/2014 | Ichinose et al. | 701/22 |
| 2009/0099718 A1 * | 4/2009 | Kobetz | 701/29 |
| 2010/0094495 A1 * | 4/2010 | Fujimoto et al. | 701/22 |
| 2012/0265400 A1 * | 10/2012 | Oikawa | 701/37 |

FOREIGN PATENT DOCUMENTS

| | | |
|---|---|---|
| JP | 2006-136175 | 5/2006 |
| JP | 2008-236914 | 10/2008 |
| JP | 2009-273274 | 11/2009 |
| WO | WO 2008/111436 A1 | 9/2008 |

* cited by examiner

ELECTRICALLY DRIVEN VEHICLE

TECHNICAL FIELD

The present invention relates to an electrically driven vehicle that runs when drive wheels are driven by an electric motor.

BACKGROUND ART

If a driver steps on an accelerator pedal to accelerate a vehicle when the vehicle is run on a frozen, snow-packed, or other slippery road surface, drive wheels may rapidly increase their speed and spin. If, on the other hand, the driver steps on a brake pedal to decelerate the vehicle, the drive wheels may rapidly decrease their speeds and lock up. These phenomena are hereinafter referred to as slippage. If such drive wheel slippage occurs, the behavior of the vehicle becomes unstable. In addition, steering control does not work to the detriment of running stability. It is therefore important to suppress such drive wheel slippage.

A conventional method of suppressing vehicle drive wheel slippage (slippage suppression control) is exercised in the event of drive wheel slippage to suppress the slippage by reducing the torque of an electric motor that drives the drive wheels. When the slippage is stopped, this method restores the reduced torque of the electric motor. A vehicle that uses such a slippage suppression method is described, for instance, in JP-A-1990-299402.

PRIOR ART LITERATURE

Patent Document

Patent Document 1: JP-1990-299402-A

SUMMARY OF THE INVENTION

Problem to be Solved by the Invention

However, if the slippage is suppressed by reducing and restoring the torque of the electric motor as mentioned above, the torque variation of the electric motor may become significant to cause pitching vibration of the vehicle. In other words, if the torque of the electric motor greatly varies, longitudinal acceleration applied to the vehicle greatly changes so that the vehicle is subjected to pitching vibration. If, in this instance, the natural frequency of the vehicle's pitching vibration approaches a frequency at which the torque of the electric motor varies, thereby causing resonance between the torque variation of the electric motor and the pitching vibration of the vehicle, the amplitude of the pitching vibration significantly increases to drastically degrade ride comfort of the vehicle.

When the torque of the electric motor is varied as described above to suppress the slippage, the pitching vibration of the vehicle may increase to degrade the ride comfort of the vehicle.

An object of the present invention is to provide an electrically driven vehicle that is capable of suppressing drive wheel slippage without increasing the pitching vibration of the vehicle.

Means for Solving the Problem

In accomplishing the above object, according to an aspect of the present invention, there is provided an electrically driven vehicle having electric motors, drive wheels driven by the electric motors respectively, and, when at least one of the driven wheels slips, electric motor control means for reducing the torque of at least one of the electric motors that drives the at least one wheels slipped, and for restoring the torque of the at least one electric motor when the slippage is stopped. The electrically driven vehicle includes pitching detection means for detecting the amplitude of pitching vibration to which the vehicle is subjected. The amount of electric motor torque to be restored by the electric motor control means over a predetermined period of time after the slippage is stopped varies depending on whether or not the amplitude detected by the pitching detection means is greater than an assessment value.

When the amount of electric motor torque to be restored by the electric motor control means over a predetermined period of time varies as described above depending on whether or not the amplitude detected by the pitching detection means is greater than the assessment value, the natural frequency of the pitching vibration can be made different from the frequency at which the torque output from the electric motor varies. As this makes it possible to prevent the pitching vibration from increasing, the slippage can be suppressed without increasing the pitching vibration. Consequently, running stability can be maintained while preventing the ride comfort of a vehicle running on a slippery road surface from being degraded.

Advantages of the Invention

As the present invention makes it possible to suppress the slippage without increasing the pitching vibration, running stability can be maintained while preventing the ride comfort of a vehicle running on a slippery road surface from being degraded.

MODE FOR CARRYING OUT THE INVENTION

Embodiments of the present invention will now be described with reference to the accompanying drawings.

Figure 1:
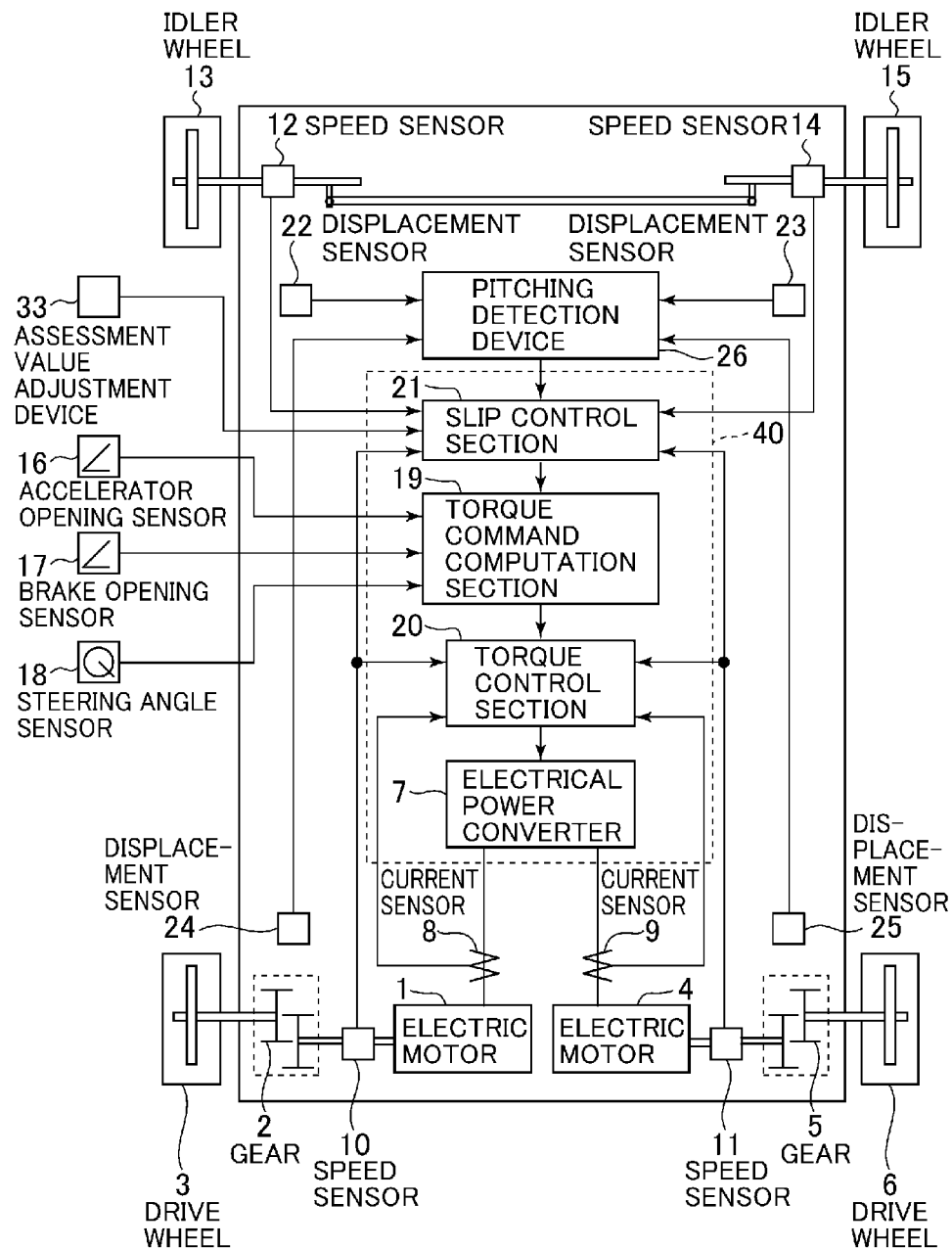
FIG. 1 is a diagram illustrating a configuration of an electrically driven vehicle according to a first embodiment of the present invention.

FIG. 1 is a diagram illustrating a configuration of an electrically driven vehicle according to a first embodiment of the present invention. The electrically driven vehicle shown in FIG. 1 includes a drive wheel 3, a drive wheel 6, an idler wheel 13, an idler wheel 15, displacement sensors 22, 23, 24 and 25 for detecting the vertical displacement of suspensions coupled to the drive wheels 3 and 6 and to the idler wheels 13 and 15, speed sensors 12 and 14 for detecting the rotation speed of the idler wheels 13 and 15, an electric motor 1 for driving the drive wheel 3 through a gear 2, an electric motor 4 for driving the drive wheel 6 through a gear 5, speed sensors 10 and 11 for detecting the rotation speed of the electric motors 1 and 4, an electric motor control device (electric motor control means) 40 for controlling the electric motors 1 and 4, and a pitching detection device (pitching detection means) 26 for detecting the amplitude of pitching vibration to which the vehicle is subjected.

The displacement sensor 22 detects the vertical displacement of a suspension (not shown) coupled to the idler wheel 13. The displacement sensor 23 detects the vertical displacement of a suspension (not shown) coupled to the idler wheel 15. The displacement sensor 24 detects the vertical displacement of a suspension (not shown) coupled to the drive wheel 3. The displacement sensor 25 detects the vertical displacement of a suspension (not shown) coupled to the drive wheel 6. The displacement sensors 22, 23, 24 and 25 are connected to the pitching detection device 26 so that the displacements detected by the displacement sensors 22, 23, 24 and 25 are output to the pitching detection device 26.

In accordance with the detected vertical displacement of each suspension, which is output from the displacement sensors 22, 23, 24 and 25, the pitching detection device 26 detects the amplitude of pitching vibration to which the vehicle is subjected (the amplitude detected by the pitching detection device 26 may be hereinafter referred to as the amplitude A). The amplitude A of pitching vibration, which is detected by the pitching detection device 26, is output to a slip control section 21 in the electric motor control device 40.

The electric motor control device 40 includes the slip control section 21, a torque command computation section 19, a torque control section 20, and an electrical power converter 7. The electric motors 1 and 4 are controlled by the electric motor control device 40. The vehicle moves forward or rearward when the electric motors 1, 4 drive the drive wheels 3 and 6 through the gears 2 and 5.

The speed sensor 10, which detects the rotation speed of the electric motor 1, is connected to the electric motor 1. The speed sensor 11, which detects the rotation speed of the electric motor 4, is connected to the electric motor 4. The speed sensor 12, which detects the rotation speed of the idler wheel 13, is connected to an axle of the idler wheel 13. The speed sensor 14, which detects the rotation speed of the idler wheel 15, is connected to an axle of the idler wheel 15. The speed sensors 10, 11, 12 and 14 are connected to the slip control section 21 so that the speeds detected by the speed sensors 10, 11, 12 and 14 are output to the slip control section 21.

The slip control section 21 receives detected rotation speeds that are output from the speed sensors 10, 11, 12 and 14, determines whether at least one of the drive wheels 3 and 6 is slipping, and also determines whether the amplitude A output from the pitching detection device 26 is greater than an assessment value A1. In accordance with such determination results, the slip control section 21 outputs an appropriate later-described command (a torque reduction command, a torque restoration command, or a restoration time change command) to the torque command computation section 19. The assessment value A1 is a setting stored in the slip control section 21 and used as an assessment criterion for determining whether or not to output the restoration time change command (described later) for the purpose of suppressing the pitching vibration. The assessment value A1 can be adjusted by a later-described assessment value adjustment device 33. The slip control section 21 in the present embodiment compares the rotation speeds of the idler wheels 13 and 15 to those of the drive wheels 3 and 6 to determine whether the drive wheels 3 and 6 are slipping. An alternative in this case is to calculate the speed of the electrically driven vehicle (vehicle speed) instead of the rotation speeds of the idler wheels 13 and 15 and compare the calculated speed to the rotation speeds of the drive wheels 3 and 6 in order to determine whether slippage has occurred.

If it is determined that at least one of the drive wheels 3 and 6 of the vehicle in a normal running state is slipping, the slip control section 21 first attempts to stop the slippage by outputting the torque reduction command to the torque command computation section 19. The torque reduction command reduces the torque of the electric motor 1, 4 driving the slipping drive wheel 3, 6 to a value smaller than a target torque (described later).

If it is determined that the drive wheels 3 and 6 are not slipping during the output of the torque reduction command (that is, the slippage is stopped), the slip control section 21 attempts to restore the normal running state by outputting the torque restoration command to the torque command computation section 19. The torque restoration command restores the torque of the electric motor 1, 4 driving the no-longer-slipping drive wheel 3, 6 (the torque of the electric motor 1, 4 whose torque is reduced to a value smaller than the target torque by the torque reduction command) to the target torque. In the present embodiment, a fixed value Po (this may be hereinafter referred to as the initial value) is employed as described later as the rate of torque restoration provided for the electric motors 1 and 4 by the torque restoration command (the amount of torque restoration per hour).

Further, if it is determined that the assessment value A1 is exceeded by the amplitude A output from the pitching detection device 26 during the output of the torque restoration command, the slip control section 21 attempts to reduce the pitching vibration by outputting the restoration time change command to the torque command computation section 19. The restoration time change command changes the time for restoring the torque of the electric motor 1, 4 to the target torque so that the time for restoring the torque of the electric motor 1, 4 whose torque is being restored by the torque restoration command to the target torque varies depending on whether or not the amplitude A is greater than the assessment value A1. In other words, the restoration time change command ensures that the amount of torque of the electric motor 1, 4 to be restored by the electric motor control device 40 over a predetermined period of time after the stop of slippage varies depending on whether or not the amplitude A, which is detected by the pitching detection device 26, is greater than the assessment value A1. In the present embodiment, as described later, the restoration time change command changes the torque restoration rate to P1, which is a value smaller than Po (P1<Po).

If it is determined that the drive wheels 3 and 6 are not slipping, the slip control section 21 does not output any particular command to the torque command computation section 19.

An accelerator opening sensor 16, a brake opening sensor 17, and a steering angle sensor 18 are connected to the torque command computation section 19. The accelerator opening sensor 16 detects the degree of opening of an accelerator pedal, which varies in accordance with an accelerator pedal operation performed by a driver of the vehicle, and outputs the detected degree of accelerator pedal opening to the torque command computation section 19. The brake opening sensor 17 detects the degree of opening of a brake pedal, which varies in accordance with a brake pedal operation performed by the driver, and outputs the detected degree of brake pedal opening to the torque command computation section 19. The steering angle sensor 18 detects the angle of a steering, which varies in accordance with a steering operation performed by the driver, and outputs the detected steering angle to the torque command computation section 19.

The assessment value adjustment device 33 is connected to the slip control section 21 to provide external adjustment of the assessment value A1 which is compared in the slip control section 21 to the amplitude A of pitching vibration. The assessment value adjustment device 33 outputs an increase/decrease command for the assessment value A1. The slip control section 21 receives the increase/decrease command from the assessment value adjustment device 33 and increases or decreases the assessment value A1. The assessment value adjustment device 33, which is installed, for instance, in a cab of the vehicle, adjusts the assessment value A1 when the driver manipulates the assessment value adjustment device 33. When, for instance, the driver of the vehicle running on a slippery road surface is worried about pitching vibration that occurs during slip suppression control, the driver can reduce the pitching vibration by performing a procedure for decreasing the assessment value A1. When the assessment value adjustment device 33 is installed as described above, the driver can freely adjust the magnitude of pitching vibration to suit his/her preference. The assessment value adjustment device 33 may be, for example, of a switch type or of dial type.

The torque command computation section 19 receives a detected accelerator opening value from the accelerator opening sensor 16, a detected brake opening value from the brake opening sensor 17, and a detected steering angle value from the steering angle sensor 18, and calculates a target torque for the electric motor 1, 4. Further, the torque command computation section 19 calculates a corrected torque by correcting the target torque depending on whether a command (torque reduction command, torque restoration command, or restoration time change command) is received from the slip control section 21 and in accordance with the type of a received command. Next, the torque command computation section 19 calculates a torque command that causes the electric motor 1, 4 to output the target torque or the corrected torque, and outputs the calculated torque command to the torque control section 20.

A torque correction process that is performed by the torque command computation section 19 when a command is output from the slip control section 21 will now be described. When the torque reduction command is output, the torque command computation section 19 calculates a corrected torque for the purpose of decreasing the target torque, which is calculated from the values detected by the sensors 16, 17 and 18. In the present embodiment, it is assumed that the amount of torque reduction per hour (torque reduction rate) is fixed. Therefore, the corrected torque is calculated so that the torque decreases at a fixed rate from the instant at which the occurrence of slippage is recognized by the slip control section 21 to the instant at which the stop of slippage is recognized by the slip control section 21.

When the torque restoration command is output, the torque command computation section 19 calculates a corrected torque for the purpose of restoring the torque of the electric motor 1, 4, which is reduced to a value smaller than the target torque by the torque reduction command, to the target torque. In the present embodiment, it is assumed that the torque restoration rate is fixed at Po. Therefore, the corrected torque is calculated until the torque of the electric motor 1, 4, which is reduced to a value smaller than the target torque by the torque reduction command, is restored to the target torque at the fixed restoration rate Po or until the output of the torque restoration command is stopped. When the torque command for the electric motor 1, 4 is changed as described above in accordance with the slippage of the drive wheels 3 and 6, the slippage of the drive wheels 3 and 6 can be suppressed.

When the restoration time change command is output, the torque command computation section 19 calculates a corrected torque so that the time over which the torque of the electric motor 1, 4, which is being subjected to torque restoration by the torque restoration command, is restored to the target torque varies depending on whether or not the amplitude A of pitching vibration is greater than the assessment value A1. In other words, the corrected torque is calculated so that the amount of torque of the electric motor 1, 4 to be restored over a predetermined period of time varies depending on whether or not the amplitude A of pitching vibration is greater than the assessment value A1. In the present embodiment, the torque restoration rate used for the restoration of torque of the electric motor 1, 4 is changed to a value P1 (P1<Po) smaller than the value Po prevailing when the amplitude A is not greater than the assessment value A1. Therefore, the corrected torque is calculated until the torque of the electric motor 1, 4, which is reduced to a value smaller than the target torque, is restored at the fixed restoration rate P1 to the target torque or until the output of the restoration time change command is stopped. This ensures that the time required for the restoration of torque of the electric motor 1, 4 is longer than when the amplitude A is not greater than the assessment value A1.

It is preferred that the torque restoration rate P1 used when the amplitude A of pitching vibration is greater than the assessment value A1 be approximately ½ to ⅓ the torque restoration rate Po used when the amplitude A of pitching vibration is not greater than the assessment value A1. The reason is that the use of an excessively low torque restoration rate may unduly increase the time required for the restoration of the torque output from the electric motor 1, 4 and degrade the acceleration/deceleration performance of the vehicle although the torque restoration rate P1 can be decreased as decreasing the torque restoration rate can alter the change frequency of the torque output from the electric motor 1, 4 and make it easier to avoid resonance with pitching vibration. Therefore, if the degradation of the vehicle's acceleration/deceleration performance does not constitute a problem, the torque restoration rate may be decreased to ⅓ the value Po or less.

A current sensor 8 is connected between the electrical power converter 7 and the electric motor 1 to detect an electrical current flowing therebetween. An electrical current value detected by the current sensor 8 is output to the torque control section 20. A current sensor 9 is connected between the electrical power converter 7 and the electric motor 4 to detect an electrical current flowing therebetween. An electrical current value detected by the current sensor 9 is output to the torque control section 20.

In compliance with a torque command for the electric motor 1, which is output from the torque command computation section 19, with a detected electrical current value output from the current sensor 8, and with a detected rotation speed value output from the speed sensor 10, the torque control section 20 exercises pulse width modulation control (PWM control) to output a gate pulse signal to the electrical power converter 7 so that the torque output from the electric motor 1 complies with the torque command for the electric motor 1. Further, in compliance with a torque command for the electric motor 4, which is output from the torque command computation section 19, with a detected electrical current value output from the current sensor 9, and with a detected rotation speed value output from the speed sensor 11, the torque control section 20 exercises PWM control to output a gate pulse signal to the electrical power converter 7 so that the torque output from the electric motor 4 complies with the torque command for the electric motor 4.

The electrical power converter 7 receives the gate pulse signals from the torque control section 20 and provides highly-responsive torque control over the electric motors 1 and 4 by allowing an IGBT (insulated-gate bipolar transistor) or other switching element to perform high-speed switching.

Figure 2:
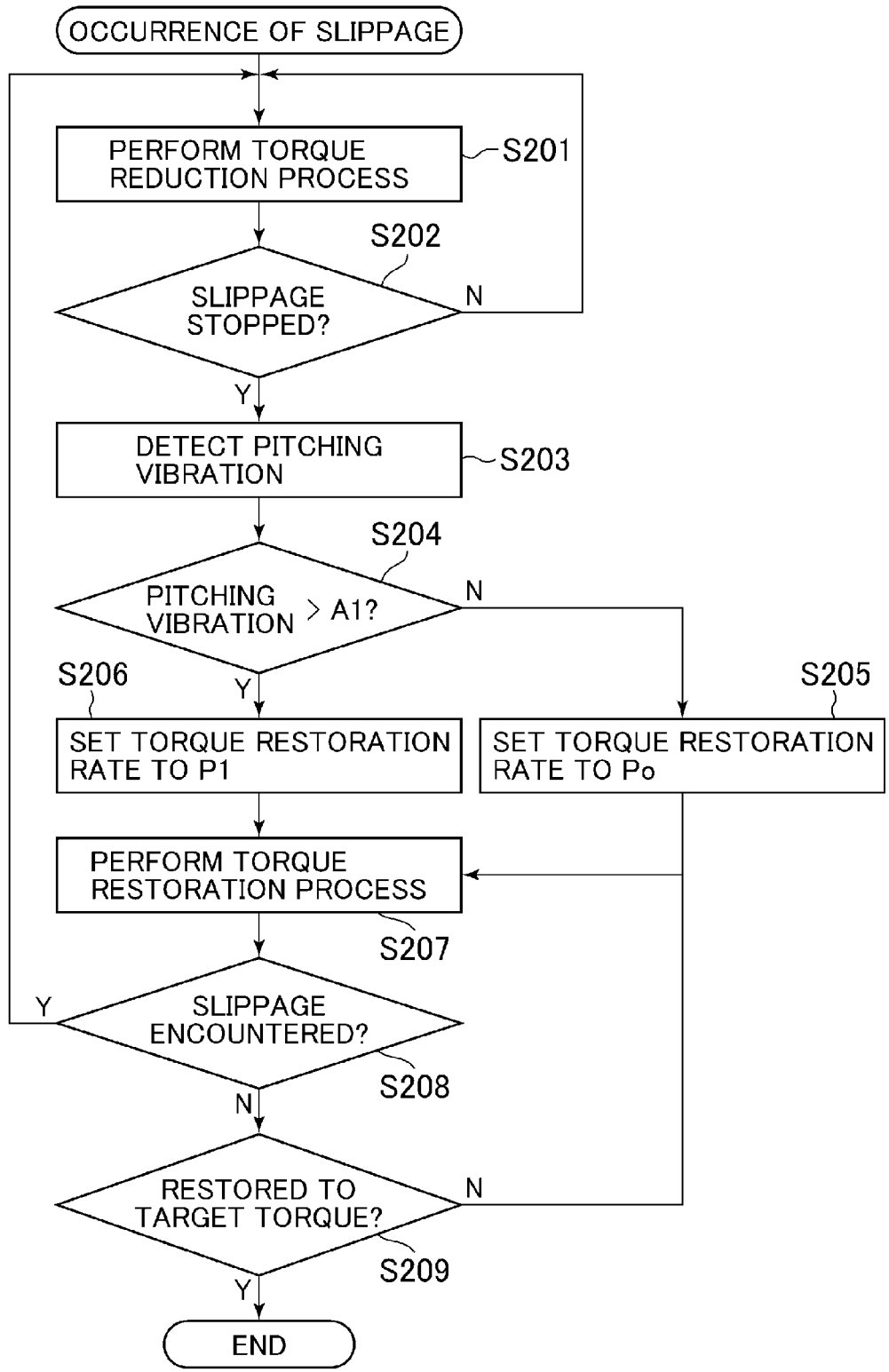
FIG. 2 is a flowchart illustrating a process performed by an electric motor control device in the electrically driven vehicle according to the first embodiment of the present invention.

FIG. 2 is a flowchart illustrating a process performed by the electric motor control device 40 in the electrically driven vehicle according to the first embodiment of the present invention. The flowchart shown in FIG. 2 starts when the slip control section 21 determines that at least one of the drive wheels 3 and 6 is slipping. If it is determined that slippage is in progress, a torque reduction process is initiated in compliance with a torque reduction command that is output from the slip control section 21 to the torque command computation section 19 (step S201). The torque of the electric motor 1, 4 driving the drive wheel 3, 6 that is found to be slipping is then reduced to stop the slippage. Upon completion of step S201, processing proceeds to step S202.

In step S202, the slip control section 21 determines whether the encountered slippage is stopped. If it is determined that the slippage is still in progress, the torque reduction process (step S201) is repeatedly performed. If, on the other hand, it is determined that the slippage is stopped, processing proceeds to step S203.

In step S203, the slip control section 21 receives the amplitude A of pitching vibration, which is output from the pitching detection device 26, and determines whether the input amplitude A is greater than the assessment value A1 (step S204). If it is determined in step S204 that the amplitude A is not greater than the assessment value A1, the torque restoration rate used for a torque restoration process is set to Po (step S205). The torque restoration process is then initiated in compliance with the torque restoration command output from the slip control section 21 to the torque command computation section 19 (step S207). This ensures that the torque of the electric motor 1, 4 is restored to the target torque prevailing before the start of slip suppression control.

If, on the other hand, it is determined in step S204 that the amplitude A is greater than the assessment value A1, the torque restoration rate used for the torque restoration process is set to P1 (P1<Po) (step S206). The torque restoration process is then initiated in compliance with a restoration time reduction command output from the slip control section 21 to the torque command computation section 19 (step S207). When the torque restoration rate is decreased as described above, the time required for the torque to be restored to the target torque increases so that the change frequency of the torque command during slip suppression control can be decreased. As a result, the natural frequency of the pitching vibration can be made different from the change frequency of the torque output from the electric motor 1, 4. This makes it possible to avoid an increase in the pitching vibration.

After the torque restoration process is initiated in step S207, the slip control section 21 determines whether slippage is encountered during the torque restoration process (step S208). If it is determined in step S208 that the drive wheel 3, 6 is slipping, processing returns to step S201 to repeat step S201 and beyond. If, on the other hand, it is determined in step S208 that no slippage is encountered, step S209 is performed to determine whether the torque of the electric motor 1, 4 is restored to the target torque by the torque restoration process.

If it is determined in step S209 that the torque of the electric motor 1, 4 is not restored to the target torque, processing returns to step S207 to continue with the torque restoration process. If, on the other hand, it is determined in step S209 that the torque of the electric motor 1, 4 is restored to the target torque, a series of processes terminates.

Exemplary operations performed by the electrically driven vehicle in accordance with the above flowchart will now be described with reference to FIGS. 3 to 6.

Figure 3:
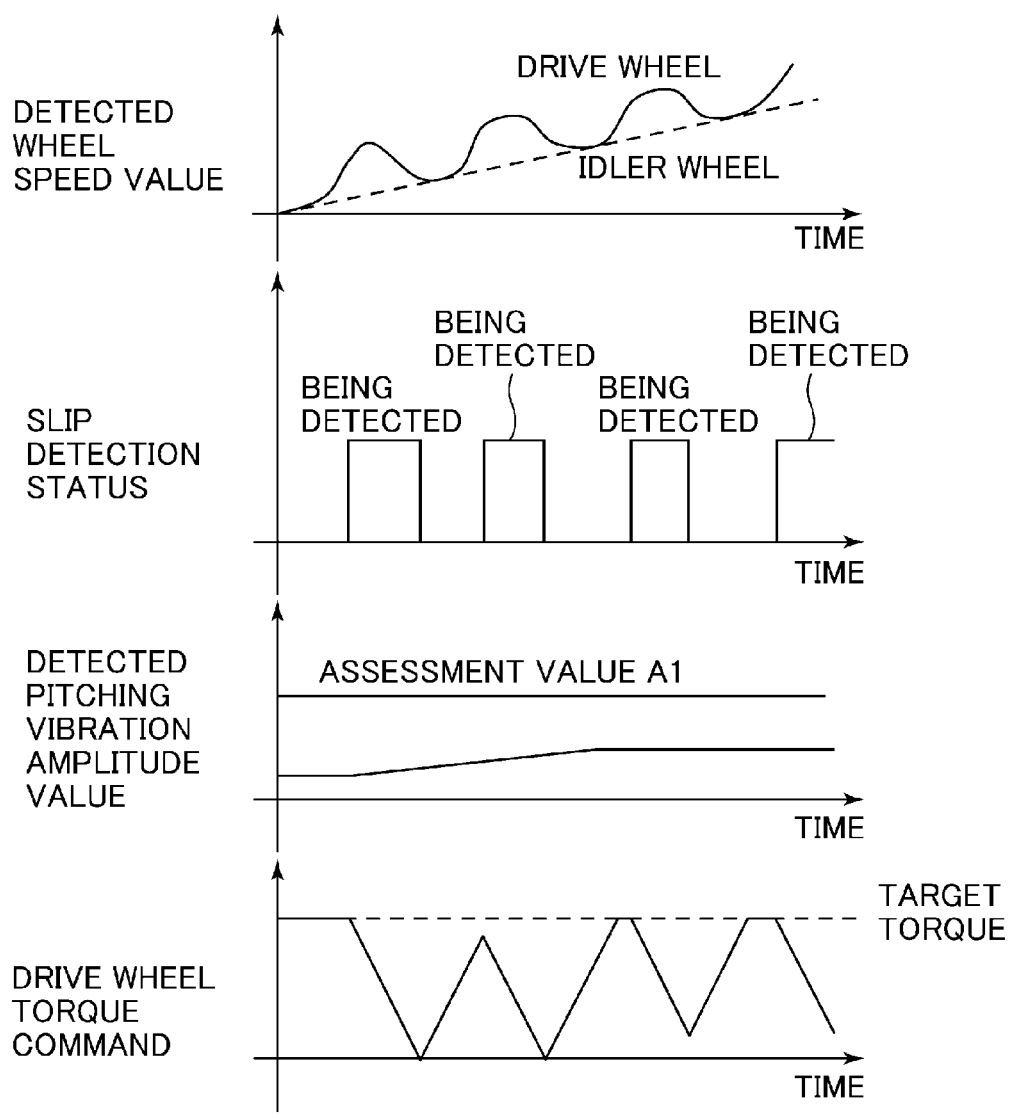
FIG. 3 is a diagram illustrating an exemplary operation that is performed by the first embodiment of the present invention in a situation where the amplitude A of pitching vibration caused when the vehicle accelerates on a slippery road surface is not greater than an assessment value A1.

FIG. 3 is a diagram illustrating an exemplary operation that is performed in a situation where the amplitude A of pitching vibration caused when the vehicle accelerates on a slippery road surface is not greater than the assessment value A1. As shown in FIG. 3, when the vehicle accelerates on a slippery road surface, slippage occurs in such a manner that the wheel speed of the drive wheel 3, 6 rapidly increases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to accelerate the vehicle while suppressing the slippage of the drive wheel 3, 6. As shown in FIG. 3, the present embodiment assumes that the torque restoration rate is invariably fixed at Po when the amplitude A of pitching vibration is not greater than the assessment value A1.

Figure 4:
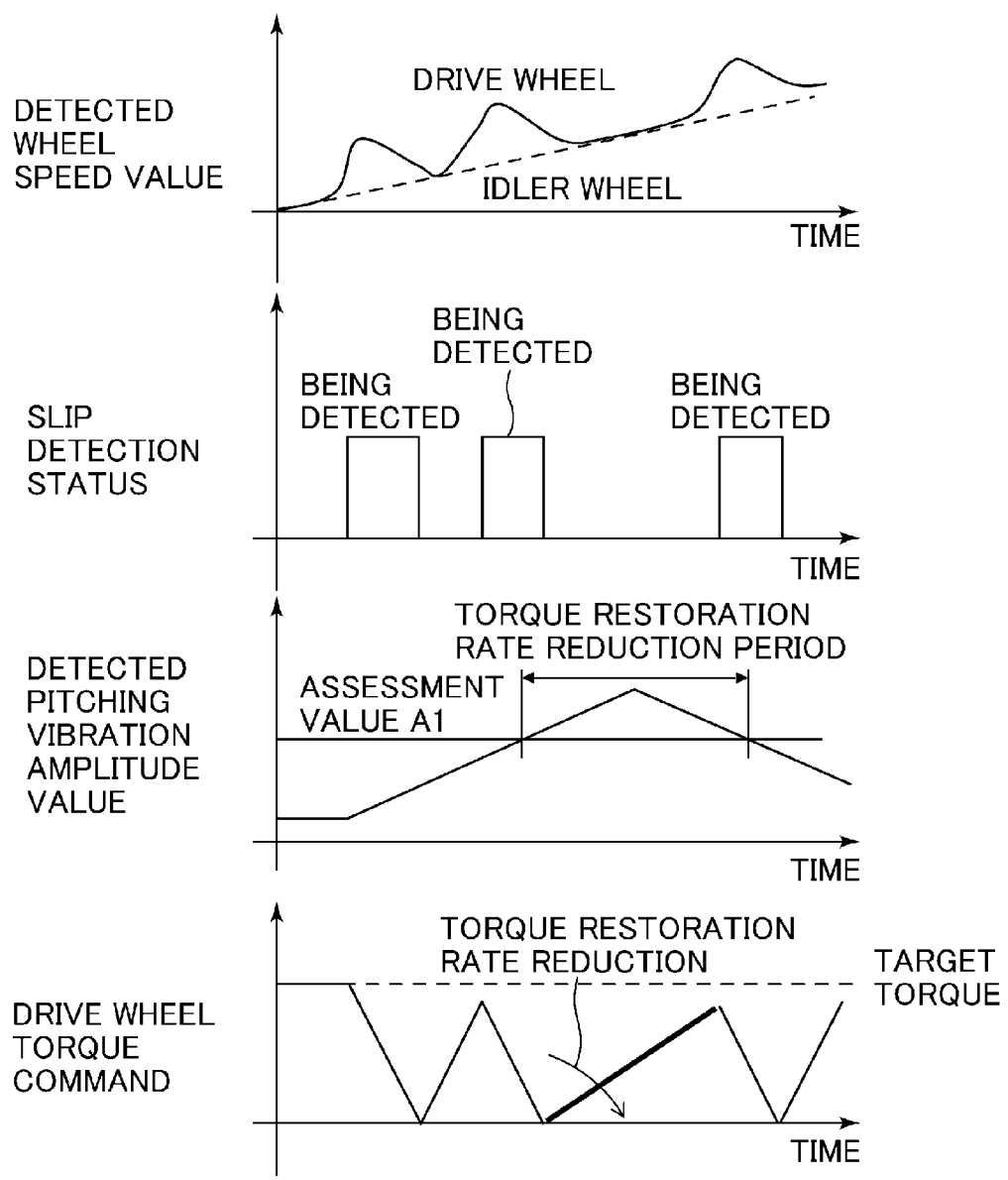
FIG. 4 is a diagram illustrating an exemplary operation that is performed by the first embodiment of the present invention in a situation where the amplitude A of pitching vibration caused when the vehicle accelerates on a slippery road surface is greater than the assessment value A1.

FIG. 4 is a diagram illustrating an exemplary operation that is performed in a situation where the amplitude A of pitching vibration caused when the vehicle accelerates on a slippery road surface is greater than the assessment value A1. As shown in FIG. 4, when the vehicle accelerates on a slippery road surface, slippage occurs in such a manner that the wheel speed of the drive wheel 3, 6 rapidly increases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to accelerate the vehicle while suppressing the slippage of the drive wheel 3, 6. However, when operations are repeatedly performed to reduce or restore the torque command for the electric motor 1, 4 in order to suppress the slippage, changes in the torque output from the electric motor 1, 4 may resonate with the pitching vibration to increase the pitching vibration, thereby gradually increasing the amplitude A of pitching vibration as shown in FIG. 4. As such being the case, when the amplitude A of pitching vibration is greater than the assessment value A1, the torque restoration rate is changed to P1, which is smaller than Po. When the torque restoration rate is decreased as described above, the time required for the torque command to achieve restoration increases so that the change frequency of the torque command during slip suppression control can be decreased. As a result, the natural frequency of the pitching vibration differs from the change frequency of the torque output from the electric motor 1, 4 to avoid resonance. This makes it possible to prevent an increase in the pitching vibration.

Figure 5:
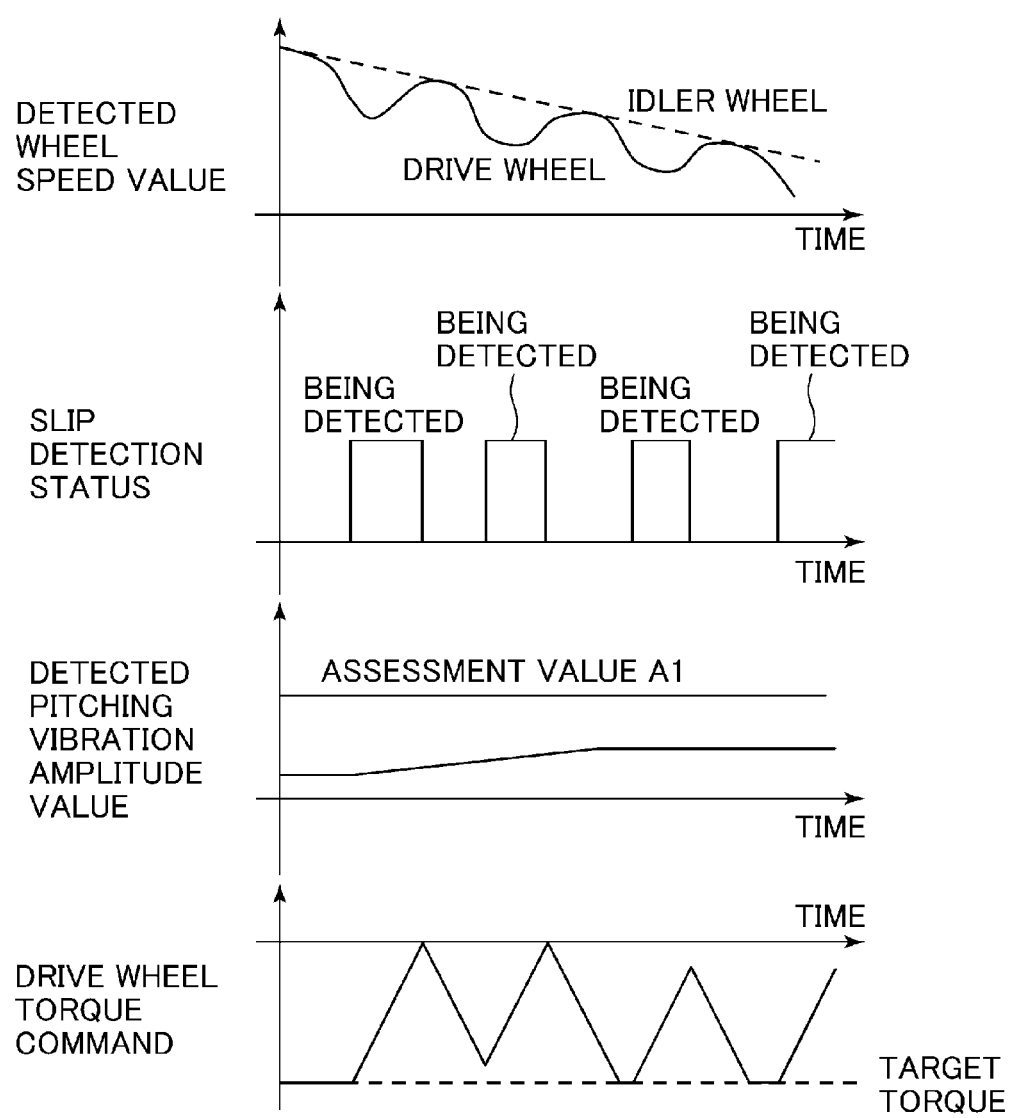
FIG. 5 is a diagram illustrating an exemplary operation that is performed by the first embodiment of the present invention in a situation where the amplitude A of pitching vibration caused when the vehicle running on a slippery road surface decelerates is not greater than the assessment value A1.

FIG. 5 is a diagram illustrating an exemplary operation that is performed in a situation where the amplitude A of pitching vibration caused when the vehicle decelerates on a slippery road surface is not greater than the assessment value A1. As shown in FIG. 5, when the vehicle decelerates on a slippery road surface, slippage occurs in such a manner that the wheel speed of the drive wheel 3, 6 rapidly decreases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to decelerate the vehicle while suppressing the slippage of the drive wheel 3, 6. As shown in FIG. 4, the present embodiment assumes that the torque restoration rate is invariably fixed at Po when the amplitude A of pitching vibration is not greater than the assessment value A1.

Figure 6:
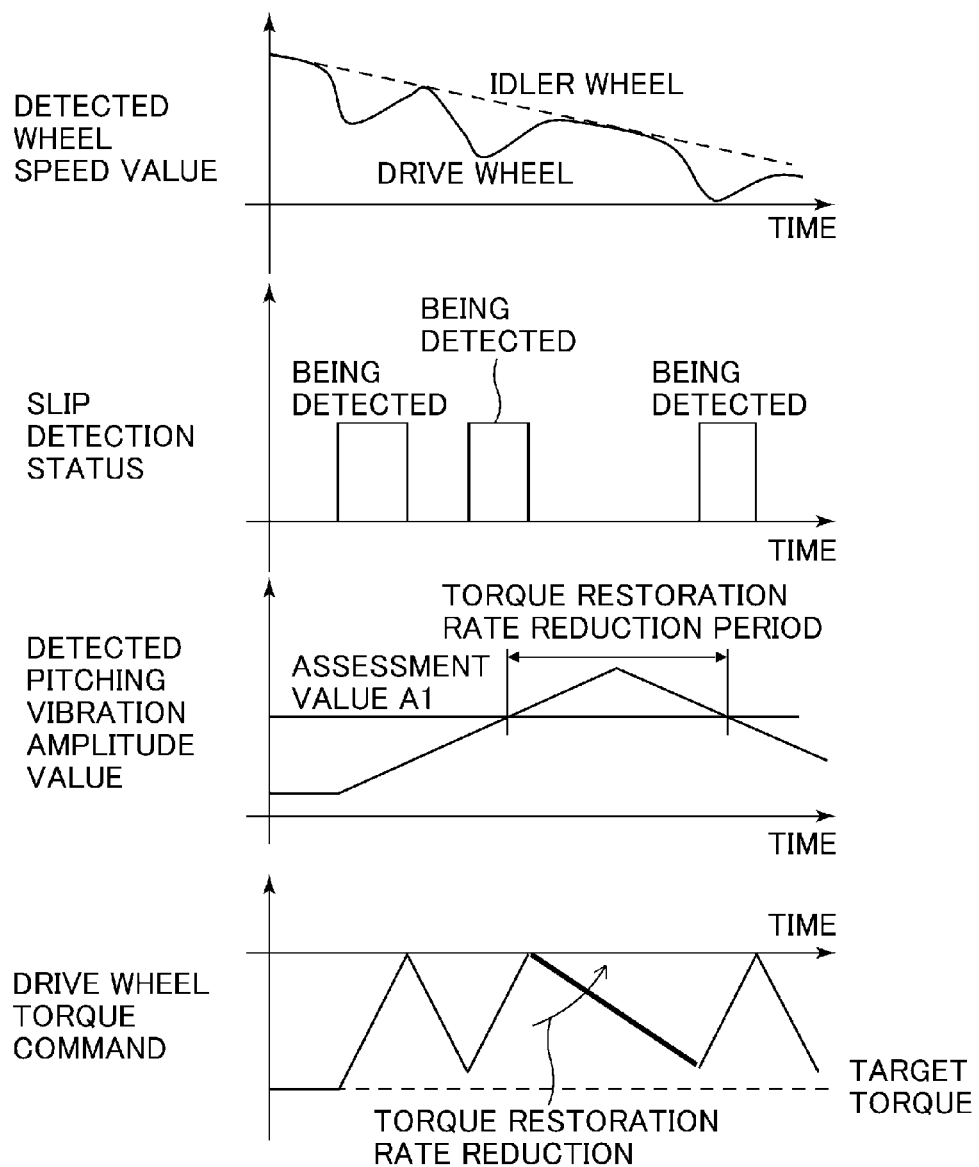
FIG. 6 is a diagram illustrating an exemplary operation that is performed by the first embodiment of the present invention in a situation where the amplitude A of pitching vibration caused when the vehicle running on a slippery road surface decelerates is greater than the assessment value A1.

FIG. 6 is a diagram illustrating an exemplary operation that is performed in a situation where the amplitude A of pitching vibration caused when the vehicle decelerates on a slippery road surface is greater than the assessment value A1. As shown in FIG. 6, when the vehicle decelerates on a slippery road surface, slippage occurs in such a manner that the wheel speed of the drive wheel 3, 6 rapidly decreases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to decelerate the vehicle while suppressing the slippage of the drive wheel 3, 6. However, when operations are repeatedly performed to reduce or restore the torque command for the electric motor 1, 4 in order to suppress the slippage, changes in the torque output from the electric motor 1, 4 may resonate with the pitching vibration to increase the pitching vibration, thereby gradually increasing the amplitude A of pitching vibration as shown in FIG. 6. As such being the case, when the amplitude A of pitching vibration is greater than the assessment value A1, the torque restoration rate is changed to P1, which is smaller than Po. When the torque restoration rate is decreased as described above, the time required for the torque command to achieve restoration increases so that the change frequency of the torque command during slip suppression control can be decreased. As a result, the natural frequency of the pitching vibration differs from the change frequency of the torque output from the electric motor 1, 4 to avoid resonance. This makes it possible to prevent an increase in the pitching vibration.

Consequently, as the present embodiment makes it possible to suppress the slippage without increasing the pitching vibration, running stability can be maintained while preventing the ride comfort of the vehicle running on a slippery road surface from being degraded.

In the above-described embodiment, it is assumed that when the amplitude A of pitching vibration is greater than the assessment value A1, the pitching vibration is suppressed by changing the torque restoration rate to the value P1, which is smaller than the initial value Po, to increase the time required for the restoration of the torque of the electric motor 1, 4 as compared to a case where the amplitude A is not greater than the assessment value A1. However, the same advantages as described above can be obtained when the amount of torque of the electric motor 1, 4 to be restored over a predetermined period of time by the electric motor control device 40 varies depending on whether or not the amplitude A of pitching vibration is greater than the assessment value A1. In other words, when the natural frequency of the pitching vibration differs from the change frequency of the torque output from the electric motor 1, 4, resonance can be avoided. Hence, the pitching vibration can be suppressed in the same manner as described above. Therefore, for example, the time required for the restoration of the torque may be shortened. A concrete method of shortening the time required for torque restoration is, for example, to change the torque restoration rate to a value greater than the initial value Po.

A second embodiment of the present invention will now be described. The foregoing embodiment changes the torque restoration rate when the amplitude A of pitching vibration is greater than the assessment value A1. However, the present embodiment suppresses the pitching vibration by halting the restoration of torque while the amplitude A is greater than the assessment value A1. More specifically, the torque command computation section 19 according to the present embodiment calculates a corrected torque in such a manner as to stop the restoration of torque when the restoration time change command is output from the slip control section 21 in a situation where the torque restoration process is initiated with slippage stopped.

Figure 7:
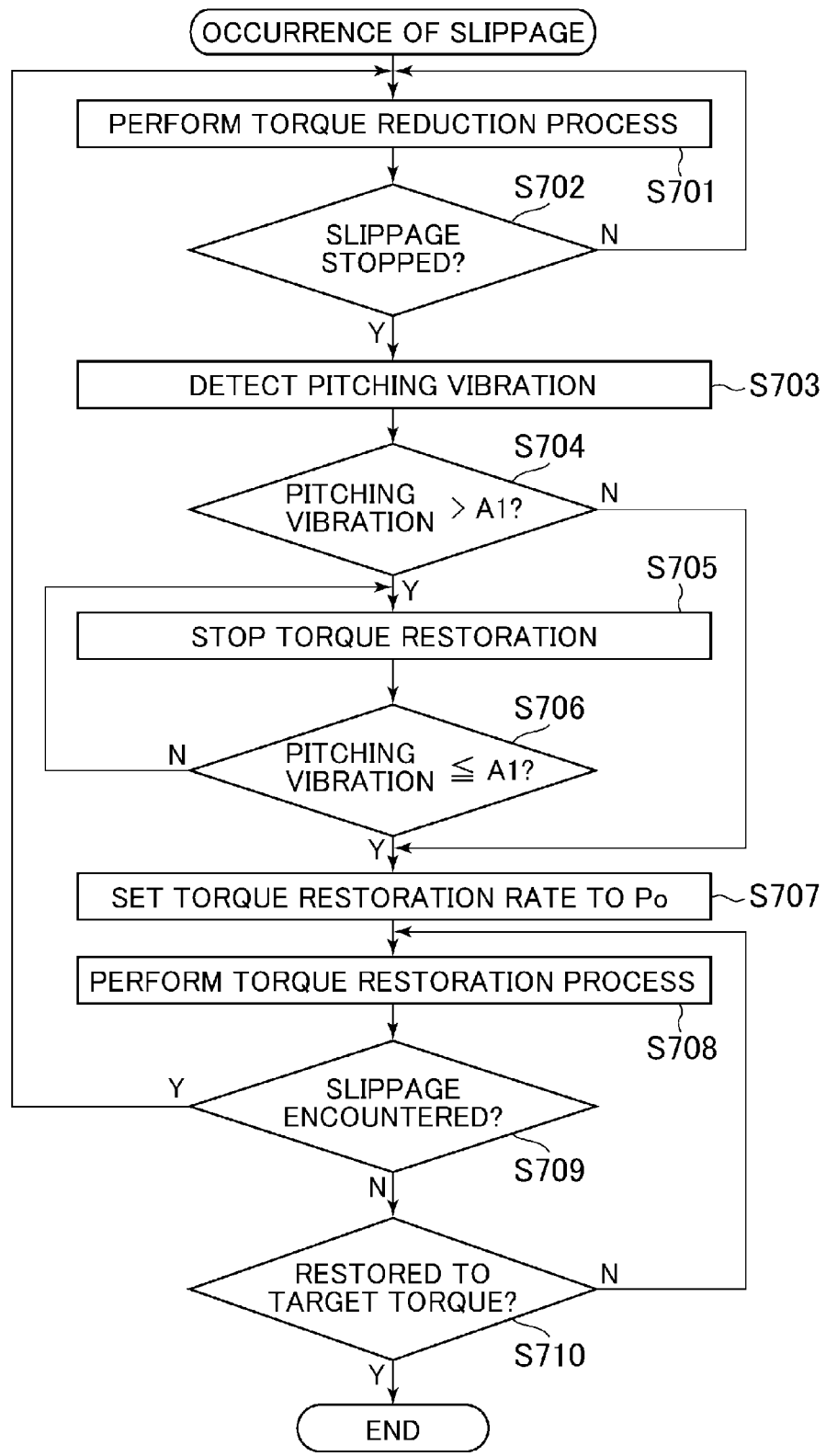
FIG. 7 is a flowchart illustrating a process performed by the electric motor control device in the electrically driven vehicle according to a second embodiment of the present invention.

FIG. 7 is a flowchart illustrating a process performed by the electric motor control device 40 in the electrically driven vehicle according to the second embodiment of the present invention. The flowchart shown in FIG. 7 starts when the slip control section 21 determines that at least one of the drive wheels 3 and 6 is slipping. If it is determined that slippage is in progress, a torque reduction process is initiated in compliance with a torque reduction command that is output from the slip control section 21 to the torque command computation section 19 (step S701). The torque of the electric motor 1, 4 driving the drive wheel 3, 6 that is found to be slipping is then reduced to stop the slippage. Upon completion of step S701, processing proceeds to step S702.

In step S702, the slip control section 21 determines whether the encountered slippage is stopped. If it is determined that the slippage is still in progress, the torque reduction process (step S701) is repeatedly performed. If, on the other hand, it is determined that the slippage is stopped, processing proceeds to step S703.

In step S703, the slip control section 21 receives the amplitude A of pitching vibration, which is output from the pitching detection device 26, and determines whether the input amplitude A is greater than the assessment value A1 (step S704). If it is determined in step S704 that the amplitude A is not greater than the assessment value A1, the torque restoration rate used for a torque restoration process is set to Po (step S707). The torque restoration process is then initiated in compliance with the torque restoration command output from the slip control section 21 to the torque command computation section 19 (step S708). This ensures that the torque of the electric motor 1, 4 is restored to the target torque prevailing before the start of slip suppression control.

If, on the other hand, it is determined in step S704 that the amplitude A is greater than the assessment value A1, the torque restoration process stops in compliance with the restoration time reduction command output from the slip control section 21 to the torque command computation section 19 (step S705). When the torque restoration process stops as described above, the time required for the torque to be restored to the target torque increases so that the change frequency of the torque command during slip suppression control can be decreased. As a result, the natural frequency of the pitching vibration can be made different from the change frequency of the torque output from the electric motor 1, 4. This makes it possible to avoid an increase in the pitching vibration.

When the torque restoration process begins to stop in step S705, the slip control section 21 receives the amplitude A of pitching vibration, which is output from the pitching detection device 26, and determines whether the input amplitude A is not greater than the assessment value A1 (step S706). If it is determined in step S706 that the amplitude A is greater than the assessment value A1, processing returns to step S705 to continue with the torque restoration process. If, on the other hand, it is determined that the amplitude A is not greater than the assessment value A1, the torque restoration rate used for the torque restoration process is set to Po (step S707). Upon completion of step S707, the torque restoration process starts (step S708).

When the torque restoration process starts in step S708, the slip control section 21 determines whether slippage is encountered during the torque restoration process (step S709). If it is determined in step S709 that the drive wheel 3, 6 is slipping, processing returns to step S701 to repeat step S701 and beyond. If, on the other hand, it is determined in step S709 that no slippage is encountered, step S710 is performed to determine whether the torque of the electric motor 1, 4 is restored to the target torque by the torque restoration process.

If it is determined in step S710 that the torque of the electric motor 1, 4 is not restored to the target torque, processing returns to step S708 to continue with the torque restoration process. If, on the other hand, it is determined in step S710 that the torque of the electric motor 1, 4 is restored to the target torque, a series of processes terminates.

Figure 8:
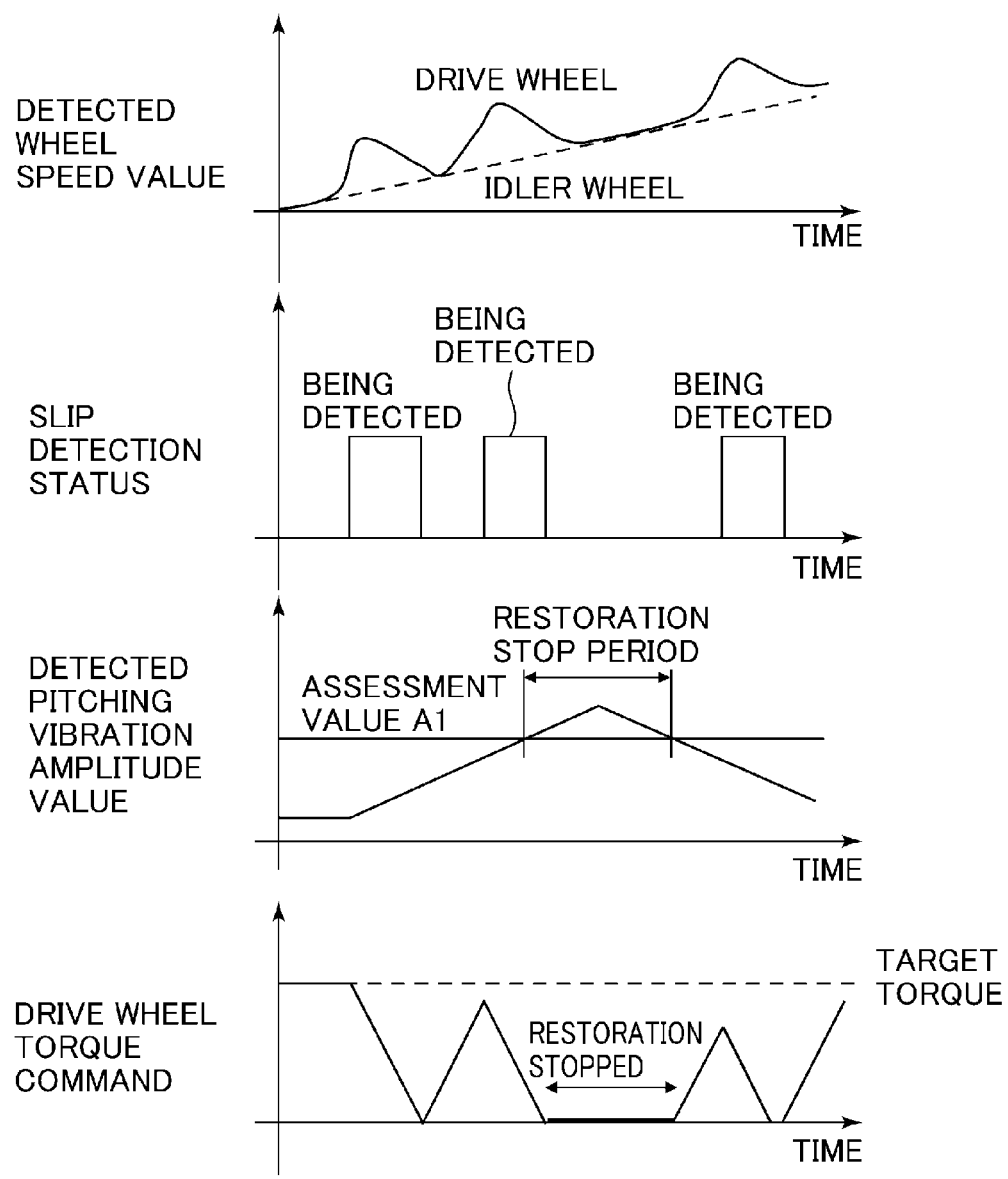
FIG. 8 is a diagram illustrating an exemplary operation that is performed by the second embodiment of the present invention in a situation where the amplitude A of pitching vibration caused when the vehicle accelerates on a slippery road surface is greater than the assessment value A1.

An exemplary operation performed by the electrically driven vehicle in accordance with the above flowchart will now be described with reference to FIG. 8. FIG. 8 is a diagram illustrating an exemplary operation that is performed in a situation where the amplitude A of pitching vibration caused when the vehicle accelerates on a slippery road surface is greater than the assessment value A1. As shown in FIG. 8, when the vehicle accelerates on a slippery road surface, slippage occurs in such a manner that the wheel speed of the drive wheel 3, 6 rapidly increases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to accelerate the vehicle while suppressing the slippage of the drive wheel 3, 6. However, when operations are repeatedly performed to reduce or restore the torque command for the electric motor 1, 4 in order to suppress the slippage, changes in the torque output from the electric motor 1, 4 may resonate with the pitching vibration to increase the pitching vibration, thereby gradually increasing the amplitude A of pitching vibration as shown in FIG. 8. As such being the case, while the amplitude A of pitching vibration is greater than the assessment value A1, the operation for restoring the torque command is stopped. When the operation for restoring the torque command is stopped as described above, the torque command does not change so that no resonance occurs. This makes it possible to avoid an increase in the pitching vibration. Although the description given here relates to a case where the pitching vibration increases when the vehicle accelerates, the same applies to a case where the vehicle decelerates.

As described above, the present embodiment also makes it possible to suppress the slippage without increasing the pitching vibration. Therefore, running stability can be maintained while preventing the ride comfort of the vehicle running on a slippery road surface from being degraded.

A third embodiment of the present invention will now be described. The foregoing embodiment stops the restoration of torque while the amplitude A of pitching vibration is greater than the assessment value A1. However, the present embodiment suppresses the pitching vibration by keeping the torque unchanged during a certain period when the amplitude A is greater than the assessment value A1. More specifically, the torque command computation section 19 according to the present embodiment calculates a corrected torque in such a manner as to keep the torque unchanged for a fixed period of time when the slip control section 21 outputs a restoration time change command in a situation where the amplitude A of pitching vibration exceeds the assessment value A1 during the torque restoration process, and to restore the torque by returning the torque restoration rate to the initial value Po after the elapse of the period during which the torque is kept unchanged.

Figure 9:
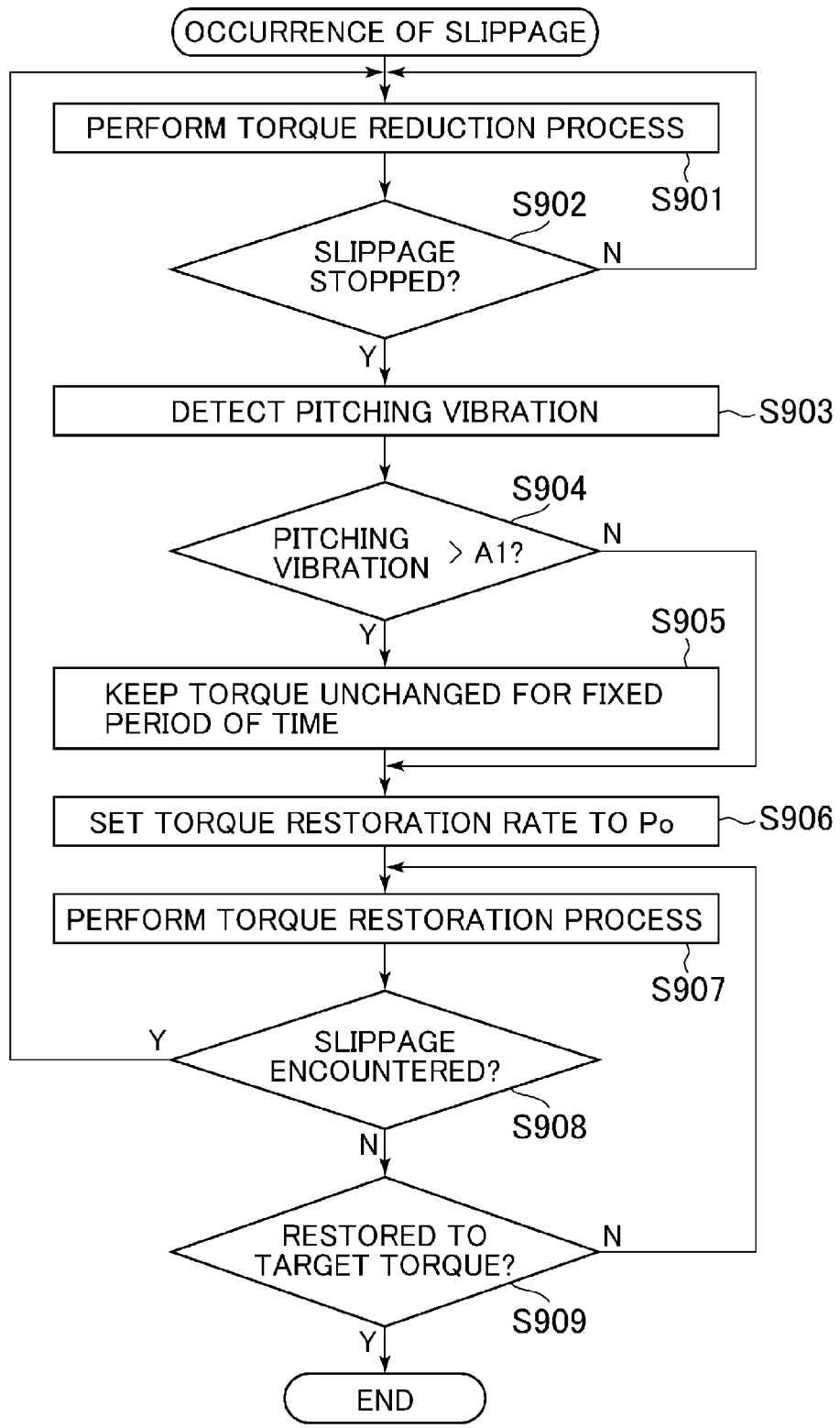
FIG. 9 is a flowchart illustrating a process performed by the electric motor control device 40 in the electrically driven vehicle according to a third embodiment of the present invention.

FIG. 9 is a flowchart illustrating a process performed by the electric motor control device 40 in the electrically driven vehicle according to the third embodiment of the present invention. The flowchart shown in FIG. 9 starts when the slip control section 21 determines that at least one of the drive wheels 3 and 6 is slipping. If it is determined that slippage is in progress, a torque reduction process is initiated in compliance with a torque reduction command that is output from the slip control section 21 to the torque command computation section 19 (step S901). The torque of the electric motor 1, 4 driving the drive wheel 3, 6 that is found to be slipping is then reduced to stop the slippage. Upon completion of step S901, processing proceeds to step S902.

In step S902, the slip control section 21 determines whether the encountered slippage is stopped. If it is determined that the slippage is still in progress, the torque reduction process (step S901) is repeatedly performed. If, on the other hand, it is determined that the slippage is stopped, processing proceeds to step S903.

In step S903, the slip control section 21 receives the amplitude A of pitching vibration, which is output from the pitching detection device 26, and determines whether the input amplitude A is greater than the assessment value A1 (step S904). If it is determined in step S904 that the amplitude A is not greater than the assessment value A1, the torque restoration rate used for a torque restoration process is set to Po (step S906). The torque restoration process is then initiated in compliance with the torque restoration command output from the slip control section 21 to the torque command computation section 19 (step S907). This ensures that the torque of the electric motor 1, 4 is restored to the target torque prevailing before the start of slip suppression control.

If, on the other hand, it is determined in step S904 that the amplitude A is greater than the assessment value A1, the torque of the electric motor 1, 4 is kept at the prevailing level for a fixed period of time in compliance with the restoration time reduction command output from the slip control section 21 to the torque command computation section 19 (step S905). When the torque is kept unchanged for the fixed period of time as described above, the time required for the torque to be restored to the target torque increases so that the change frequency of the torque command during slip suppression control can be decreased. As a result, the natural frequency of the pitching vibration can be made different from the change frequency of the torque output from the electric motor 1, 4. This makes it possible to avoid an increase in the pitching vibration. When the torque of the electric motor 1, 4 is kept unchanged for the fixed period of time in step S905, the torque restoration rate used for the torque restoration process is set to Po (step S906). Upon completion of step S906, the torque restoration process starts (step S907).

When the torque restoration process starts in step S907, the slip control section 21 determines whether slippage is encountered during the torque restoration process (step S908). If it is determined in step S908 that the drive wheel 3, 6 is slipping, processing returns to step S901 to repeat step S901 and beyond. If, on the other hand, it is determined in step S908 that no slippage is encountered, step S909 is performed to determine whether the torque of the electric motor 1, 4 is restored to the target torque by the torque restoration process.

If it is determined in step S909 that the torque of the electric motor 1, 4 is not restored to the target torque, processing returns to step S907 to repeat step S907 and beyond. If, on the other hand, it is determined in step S909 that the torque of the electric motor 1, 4 is restored to the target torque, a series of processes terminates.

Figure 10:
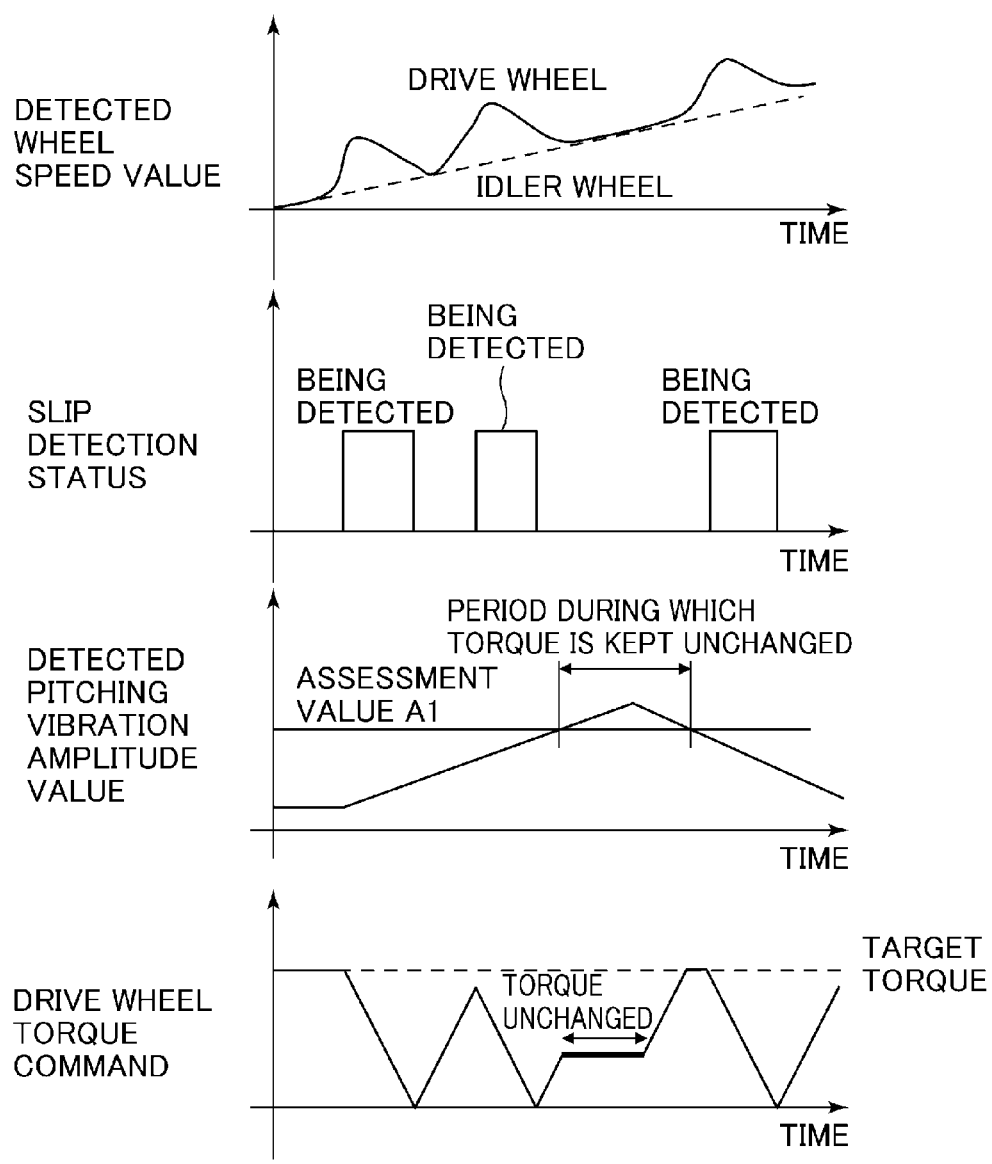
FIG. 10 is a diagram illustrating an exemplary operation that is performed by the third embodiment of the present invention in a situation where the amplitude A of pitching vibration caused when the vehicle accelerates on a slippery road surface is greater than the assessment value A1.

An exemplary operation performed by the electrically driven vehicle in accordance with the above flowchart will now be described with reference to FIG. 10. FIG. 10 is a diagram illustrating an exemplary operation that is performed in a situation where the amplitude A of pitching vibration caused when the vehicle accelerates on a slippery road surface is greater than the assessment value A1. As shown in FIG. 10, when the vehicle accelerates on a slippery road surface, slippage occurs in such a manner that the wheel speed of the drive wheel 3, 6 rapidly increases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to accelerate the vehicle while suppressing the slippage of the drive wheel 3, 6. However, when operations are repeatedly performed to reduce or restore the torque command for the electric motor 1, 4 in order to suppress the slippage, changes in the torque output from the electric motor 1, 4 may resonate with the pitching vibration to increase the pitching vibration, thereby gradually increasing the amplitude A of pitching vibration as shown in FIG. 10. As such being the case, if the amplitude A of pitching vibration exceeds the assessment value A1, the torque is kept unchanged for a fixed period of time when the operation for restoring the torque command is performed. When the torque is kept unchanged for the fixed period of time as described above, the change frequency of the torque command output during slip suppression control can be decreased. As a result, the natural frequency of the pitching vibration differs from the change frequency of the torque output from the electric motor 1, 4 to avoid resonance. This makes it possible to prevent an increase in the pitching vibration. Although the description given here relates to a case where the pitching vibration increases when the vehicle accelerates, the same applies to a case where the vehicle decelerates.

As described above, the present embodiment also makes it possible to suppress the slippage without increasing the pitching vibration. Therefore, running stability can be maintained while preventing the ride comfort of the vehicle running on a slippery road surface from being degraded.

Although the above description deals with a case where the torque is kept unchanged for the fixed period of time after the assessment value A1 is exceeded by the amplitude A of pitching vibration, an alternative is to keep the torque unchanged when a predetermined period of time elapses after the assessment value A1 is exceeded by the amplitude A.

A fourth embodiment of the present invention will now be described. The foregoing embodiments change the time required for torque restoration when the amplitude A of pitching vibration exceeds the assessment value A1. However, the present embodiment changes the torque restoration rate in accordance with the amplitude A of pitching vibration. More specifically, the torque command computation section 19 according to the present embodiment calculates a corrected torque in such a manner as to decrease the torque restoration rate used when the torque restoration command is output from the slip control section 21 (when the torque restoration process is performed) with an increase in the amplitude A of pitching vibration, and to restore the torque of the electric motor 1, 4, which is reduced to a value smaller than the target torque by the torque reduction command, at the decreased torque restoration rate. In other words, the torque restoration rate according to the present embodiment monotonically decreases with an increase in the amplitude A of pitching vibration and monotonically increases with a decrease in the amplitude A. Further, the torque restoration rate used in the present embodiment is a function of the amplitude A. Therefore, the torque restoration rate may be hereinafter referred to as P(A). It should be noted that the slip control section 21 according to the present embodiment does not output the restoration time change command.

Figure 11:
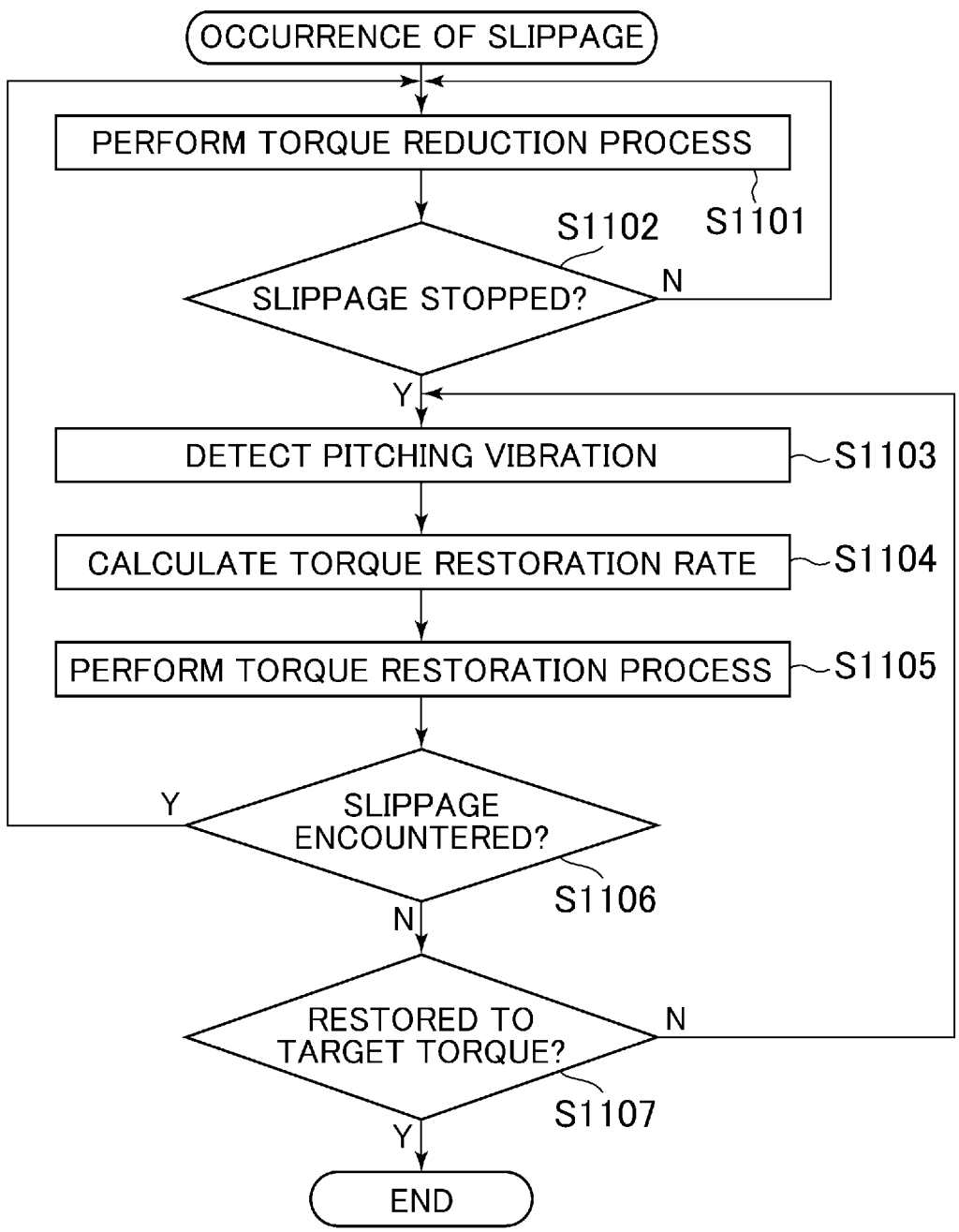
FIG. 11 is a flowchart illustrating a process performed by the electric motor control device 40 in the electrically driven vehicle according to a fourth embodiment of the present invention.

FIG. 11 is a flowchart illustrating a process performed by the electric motor control device 40 in the electrically driven vehicle according to the fourth embodiment of the present invention. The flowchart shown in FIG. 11 starts when the slip control section 21 determines that at least one of the drive wheels 3 and 6 is slipping. If it is determined that slippage is in progress, a torque reduction process is initiated in compliance with a torque reduction command that is output from the slip control section 21 to the torque command computation section 19 (step S1101). The torque of the electric motor 1, 4 driving the drive wheel 3, 6 that is found to be slipping is then reduced to stop the slippage. Upon completion of step S1101, processing proceeds to step S1102.

In step S1102, the slip control section 21 determines whether the encountered slippage is stopped. If it is determined that the slippage is still in progress, the torque reduction process (step S1101) is repeatedly performed. If, on the other hand, it is determined that the slippage is stopped, processing proceeds to step S1103.

In step S1103, the slip control section 21 receives the amplitude A of pitching vibration, which is output from the pitching detection device 26, and calculates the torque restoration rate P(A) in accordance with the input amplitude A (step S1104). After the torque restoration rate P(A) is calculated in step S1104, the torque restoration process is initiated by using the calculated torque restoration rate P(A) (step S1105). When the torque restoration process starts in step S1105, the slip control section 21 determines whether slippage is encountered during the torque restoration process (step S1106). If it is determined in step S1106 that the drive wheel 3, 6 is slipping, processing returns to step S1101 to repeat step S1101 and beyond.

If, on the other hand, it is determined in step S1106 that no slippage is encountered, step S1107 is performed to determine whether the torque of the electric motor 1, 4 is restored to the target torque by the torque restoration process. If it is determined in step S1107 that the torque of the electric motor 1, 4 is not restored to the target torque, processing returns to step S1103 to repeat step S1103 and beyond.

When the torque restoration rate P(A) is changed in accordance with the amplitude A of pitching vibration as described above, the time for restoring the torque of the electric motor 1, 4 increases so that the change frequency of the torque command output during slip suppression control can be decreased. As a result, the natural frequency of the pitching vibration can be made different from the change frequency of the torque output from the electric motor 1, 4. This makes it possible to prevent an increase in the pitching vibration. When it is determined in step S1107 that the torque of the electric motor 1, 4 has reached the target torque, a series of processes terminates.

Figure 12:
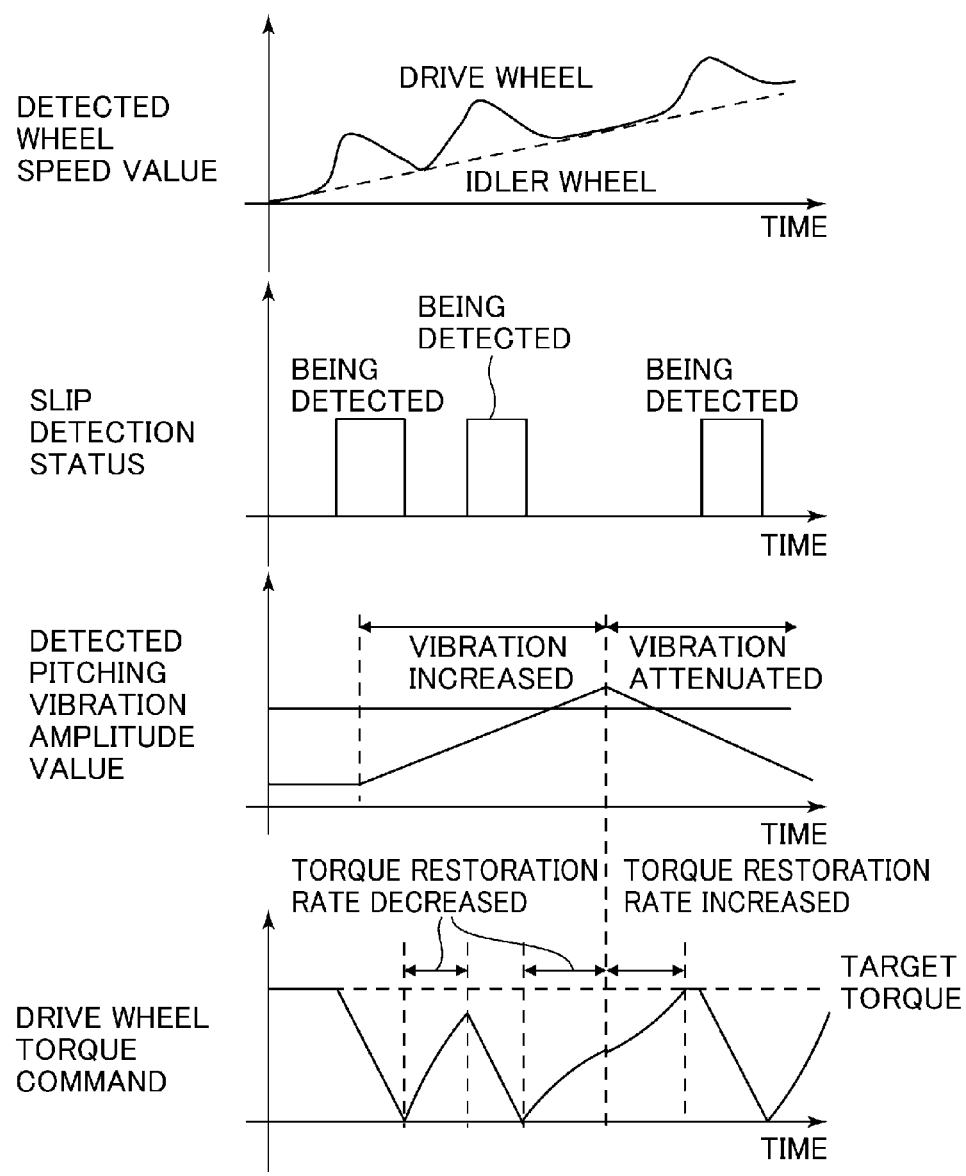
FIG. 12 is a diagram illustrating an exemplary operation that is performed by the fourth embodiment of the present invention in a situation where increased pitching vibration occurs when the vehicle accelerates on a slippery road surface.

An exemplary operation performed by the electrically driven vehicle in accordance with the above flowchart will now be described with reference to FIG. 12. FIG. 12 is a diagram illustrating an exemplary operation that is performed in a situation where the pitching vibration is increased when the vehicle accelerates on a slippery road surface. As shown in FIG. 12, when the vehicle accelerates on a slippery road surface, slippage occurs in such a manner that the wheel speed of the drive wheel 3, 6 rapidly increases. However, when the slippage of the drive wheel 3, 6 is detected, the torque command for the electric motor 1, 4 is reduced. As a result, when the slippage is stopped and no longer detected, an operation is performed to restore the torque command for the electric motor 1, 4. This makes it possible to accelerate the vehicle while suppressing the slippage of the drive wheel 3, 6. However, when operations are repeatedly performed to reduce or restore the torque command for the electric motor 1, 4 in order to suppress the slippage, changes in the torque output from the electric motor 1, 4 may resonate with the pitching vibration to increase the pitching vibration, thereby gradually increasing the amplitude A of pitching vibration as shown in FIG. 12. As such being the case, the torque restoration rate is decreased with an increase in the amplitude A of pitching vibration in order to restore the torque by using a resulting torque change rate. When the torque change rate is changed in accordance with the amplitude A as described above, the change frequency of the torque output from the electric motor 1, 4 can be decreased. As a result, the natural frequency of the pitching vibration differs from the change frequency of the torque output from the electric motor 1, 4 to avoid resonance. This makes it possible to prevent an increase in the pitching vibration. Although the description given here relates to a case where the pitching vibration increases when the vehicle accelerates, the same applies to a case where the vehicle decelerates.

As described above, the present embodiment also makes it possible to suppress the slippage without increasing the pitching vibration. Therefore, running stability can be maintained while preventing the ride comfort of the vehicle running on a slippery road surface from being degraded. It should be noted that the present embodiment constantly adjusts the torque restoration rate P(A) in accordance with the amplitude A of pitching vibration. Therefore, particularly the pitching vibration is less likely to increase in the present embodiment than in the foregoing embodiments.

Figure 13:
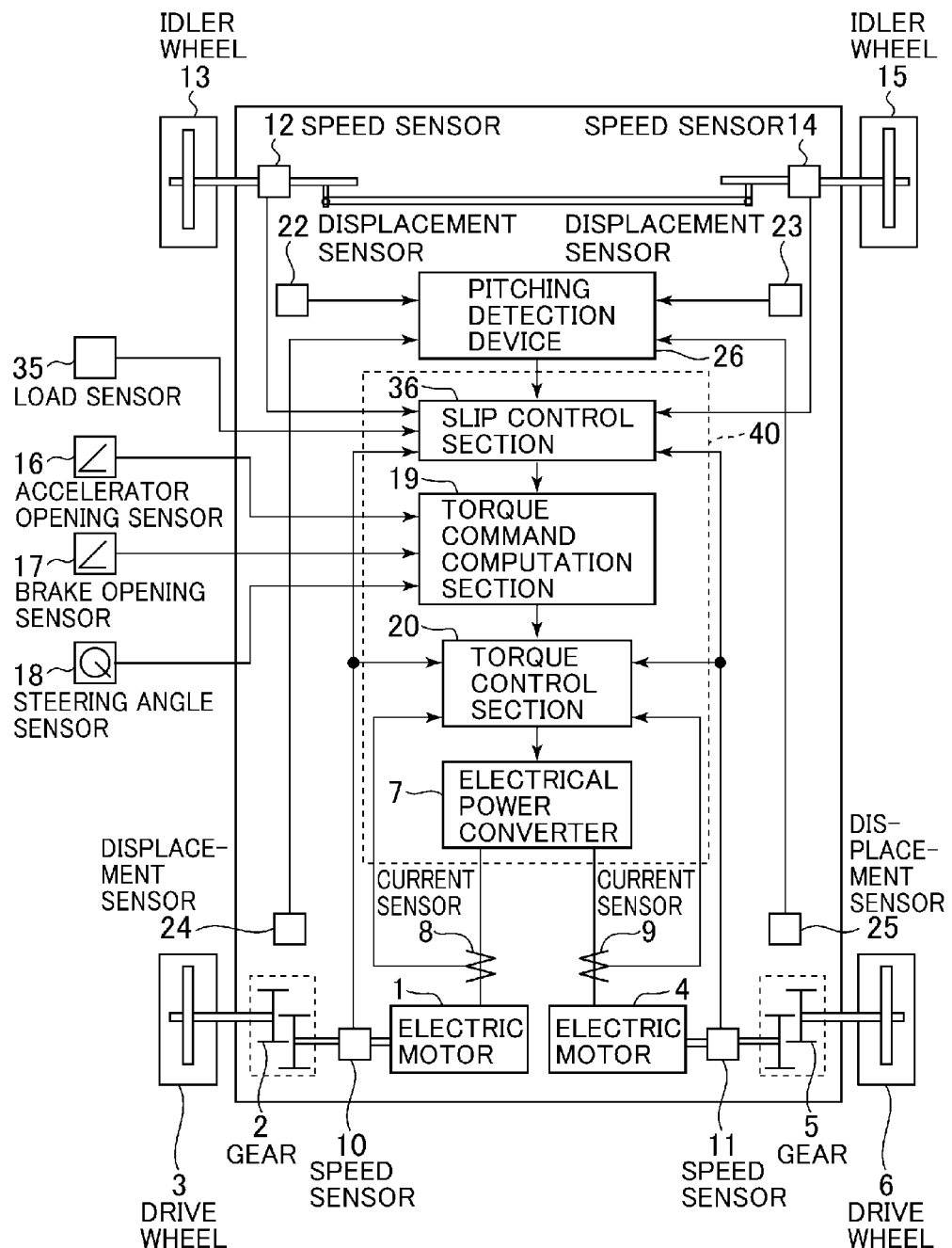
FIG. 13 is a diagram illustrating the configuration of the electrically driven vehicle according to a fifth embodiment of the present invention.

FIG. 13 is a diagram illustrating the configuration of the electrically driven vehicle according to a fifth embodiment of the present invention. Like elements in FIG. 13 and the preceding drawings are designated by the same reference numerals and will not be redundantly described. The electrically driven vehicle according to the present embodiment differs from the electrically driven vehicle shown in FIG. 1 in that the former includes a load sensor 35 and a slip control section 36. The load sensor 35 detects the load of the vehicle and outputs the detected load value to the slip control section 36. The slip control section 36 makes adjustments so that the amount of torque of the electric motor 1, 4 to be restored over a predetermined period of time by the torque restoration process performed after the slippage is stopped decreases with an increase in the load detected by the load sensor 35.

For example, the natural frequency of the pitching vibration of a truck or other vehicle whose load significantly changes varies with the load. In general, the natural frequency of the pitching vibration decreases with an increase in the load and increases with a decrease in the load. Hence, the resonance between torque changes and pitching vibration can be avoided with increased ease by decreasing the amount of torque of the electric motor 1, 4 to be restored over a predetermined period of time with an increase in the load. It means, for example, that the torque restoration rate should be increased when the load is heavy and should be decreased when the load is light.

Therefore, when the amount of torque of the electric motor 1, 4 to be restored over a predetermined period of time by the torque restoration process performed after the slippage is stopped is decreased with an increase in the load as described in conjunction with the present embodiment, the resonance between torque changes and pitching vibration can be avoided with increased ease as compared to the foregoing embodiments.

In the foregoing embodiments, the amplitude of pitching vibration to which the vehicle is subjected is detected in accordance with the detected vertical displacements of the suspensions coupled to the wheels 3, 6, 13 and 15. However, the amplitude of pitching vibration can also be detected in accordance with the other detected values described below.

Figure 14:
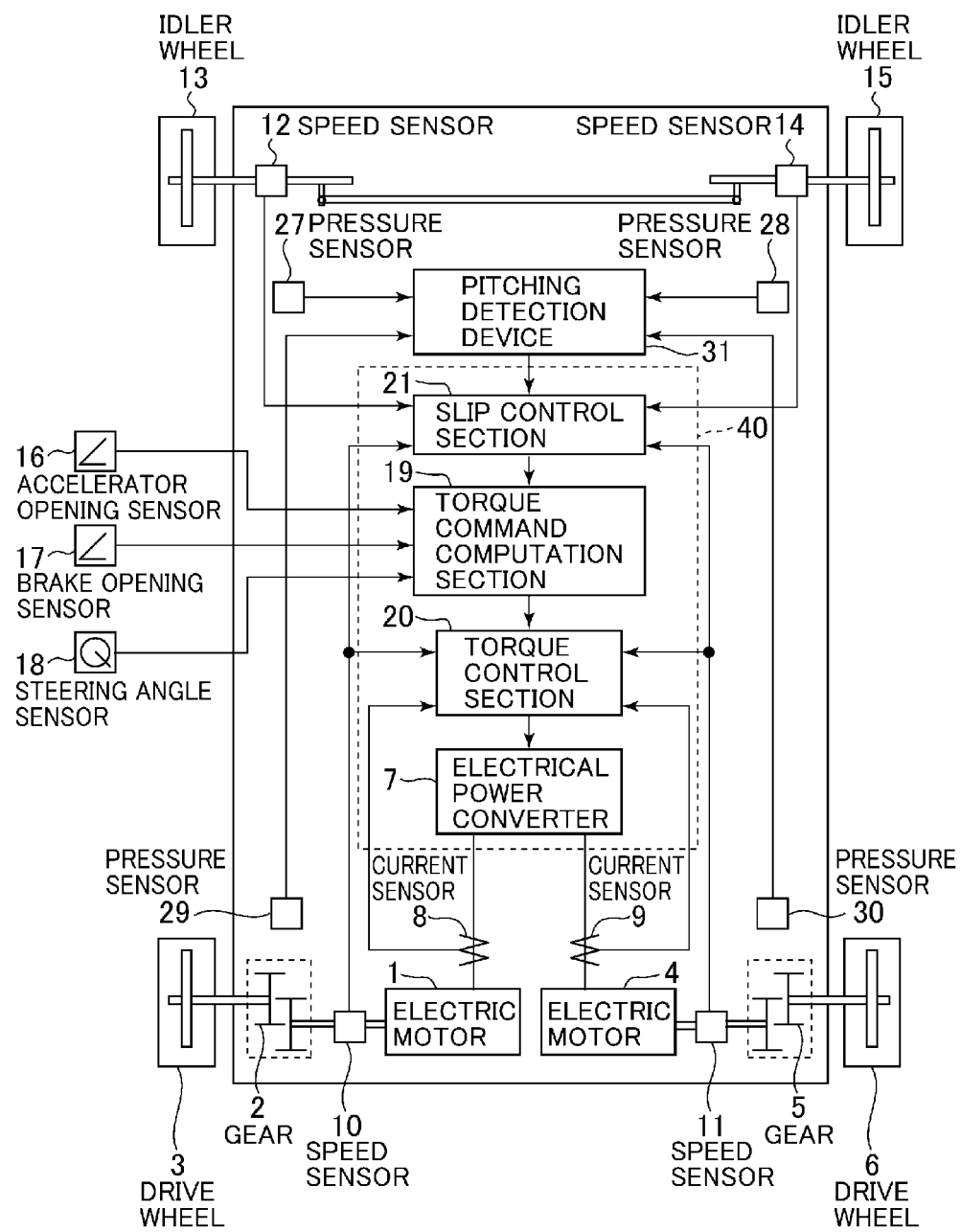
FIG. 14 is a diagram illustrating another configuration of the electrically driven vehicle according to the first embodiment of the present invention.

FIG. 14 is a diagram illustrating another configuration of the electrically driven vehicle according to the first embodiment of the present invention. The electrically driven vehicle shown in FIG. 14 differs from the electrically driven vehicle shown in FIG. 1 in that the former includes pressure sensors 27, 28, 29 and 30 and a pitching detection device 31. The pressure sensors 27, 28, 29 and 30 are used to detect the strut pressures of the suspensions and are installed instead of the displacement sensors 22, 23, 24 and 25, which detect the vertical displacements of the suspensions. In accordance with detected pressure values output from the pressure sensors 27, 28, 29 and 30, the pitching detection device 31 detects the amplitude A of pitching vibration to which the vehicle is subjected.

The pressure sensor 27 detects the strut pressure of the suspension coupled to the idler wheel 13. The pressure sensor 28 detects the strut pressure of the suspension coupled to the idler wheel 15. The pressure sensor 29 detects the strut pressure of the suspension coupled to the drive wheel 3. The pressure sensor 30 detects the strut pressure of the suspension coupled to the drive wheel 6.

The pitching detection device 31 receives detected strut pressure values of the suspensions, which are output from the pressure sensors 27, 28, 29 and 30, and detects the amplitude A of pitching vibration to which the vehicle is subjected. As the strut pressure of each suspension correlates with the vertical displacement of each suspension, the use of the strut pressure also makes it possible to detect the amplitude A of pitching vibration to which the vehicle is subjected.

Figure 15:
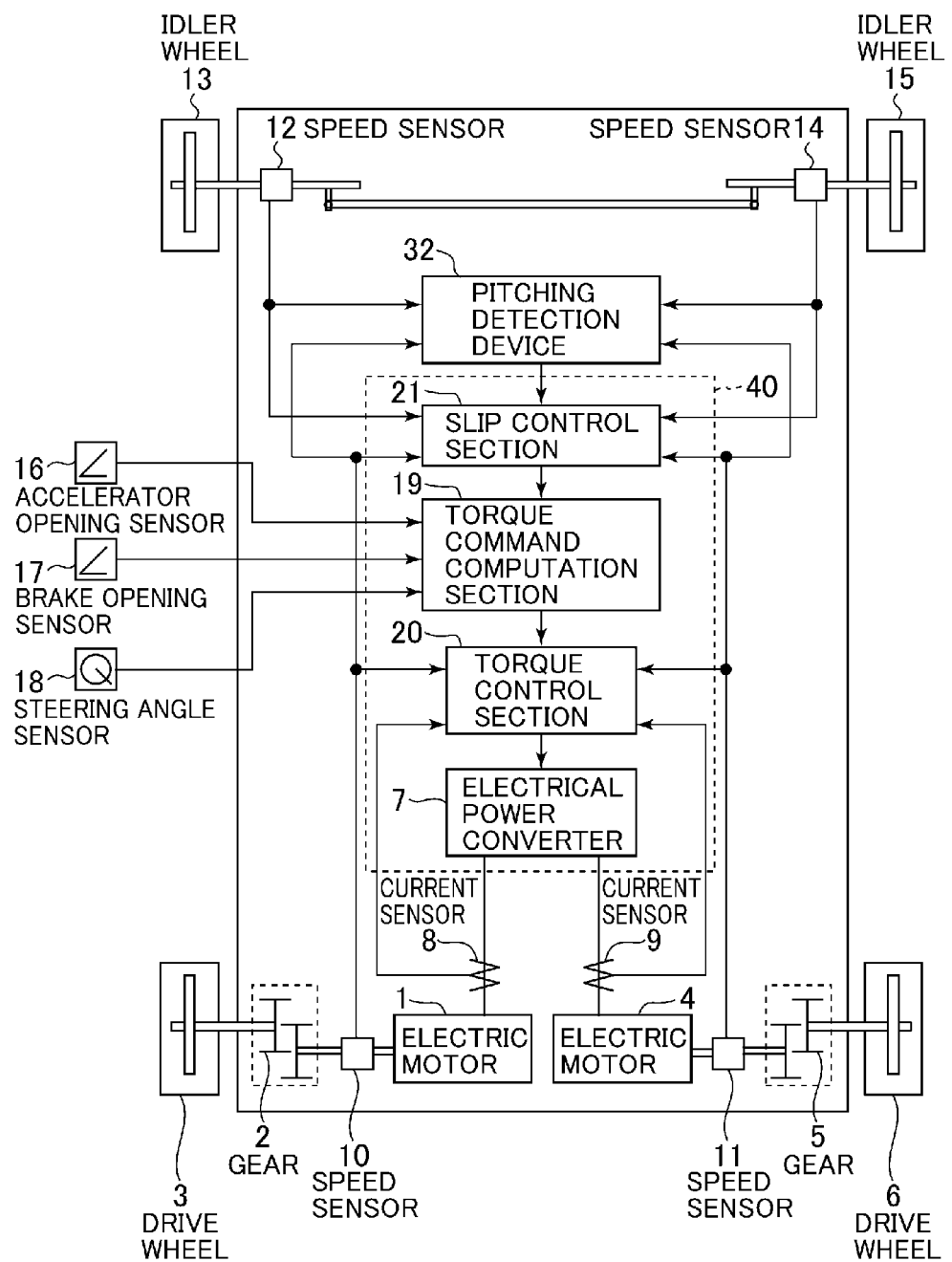
FIG. 15 is a diagram illustrating still another configuration of the electrically driven vehicle according to the first embodiment of the present invention.

FIG. 15 is a diagram illustrating still another configuration of the electrically driven vehicle according to the first embodiment of the present invention. The electrically driven vehicle shown in FIG. 15 differs from the electrically driven vehicle shown in FIG. 1 in that the former uses the rotation speeds of the wheels 3, 6, 13 and 15, which are detected by the speed sensors 10, 11, 12 and 14, instead of the vertical displacements of the suspensions and includes a pitching detection device 32. In accordance with detected vehicle speed values output from the speed sensors 10, 11, 12 and 14, the pitching detection device 32 detects the amplitude A of pitching vibration to which the vehicle is subjected.

The pitching detection device 32 receives the detected rotation speed values output from the speed sensors 10, 11, 12 and 14 and detects the amplitude A of pitching vibration to which the vehicle is subjected. When the vehicle is subjected to pitching vibration, the pitching vibration influences the rotation speeds of the drive wheels 3 and 6 and idler wheels 13 and 15. The magnitude of such influence correlates with the magnitude of pitching vibration. Therefore, the use of the rotation speeds of the wheels also makes it possible to detect the amplitude A of pitching vibration.

The foregoing description relates to a vehicle having drive wheels and idler wheels. However, the present invention is also applicable to a case where all wheels are drive wheels. When all wheels are drive wheels, it is necessary to use the vehicle speed because the rotation speeds of idler wheels cannot be used to determine whether slippage is encountered.

DESCRIPTION OF REFERENCE NUMERALS

1 . . . Electric motor
2 . . . Gear
3 . . . Drive wheel
4 . . . Electric motor
5 . . . Gear
6 . . . Drive wheel
7 . . . Electrical power converter
8 . . . Current sensor
9 . . . Current sensor
10 . . . Speed sensor
11 . . . Speed sensor
12 . . . Speed sensor
13 . . . Idler wheel
14 . . . Speed sensor
15 . . . Idler wheel
16 . . . Accelerator opening sensor
17 . . . Brake opening sensor
18 . . . Steering angle sensor
19 . . . Torque command computation section
20 . . . Torque control section
21 . . . Slip control section
22 . . . Displacement sensor
23 . . . Displacement sensor
24 . . . Displacement sensor
25 . . . Displacement sensor
26 . . . Pitching detection device
27 . . . Pressure sensor
28 . . . Pressure sensor
29 . . . Pressure sensor
30 . . . Pressure sensor
31 . . . Pitching detection device
32 . . . Pitching detection device
33 . . . Assessment value adjustment device
35 . . . Load sensor
36 . . . Slip control section
40 . . . Electric motor control device

The invention claimed is:

1. An electrically driven vehicle comprising:
electric motors;
drive wheels driven by the electric motors respectively;
electric motor control means that, when at least one of the drive wheels slips, reduces the torque of at least one of the electric motors that drives the at least one wheel slipped, and that restores the torque of the at least one electric motor when the slippage is stopped; and
pitching detection means that detects the amplitude of pitching vibration to which the vehicle is subjected,
wherein the amount of torque of the at least one electric motor to be restored by the electric motor control means over a predetermined period of time after the slippage is stopped varies depending on whether or not the amplitude detected by the pitching detection means is greater than an assessment value,
wherein, when the amplitude detected by the pitching detection means is greater than the assessment value, the electric motor control means ensures that a torque restoration rate used for restoring the torque of the at least one electric motor is lower than when the amplitude is not greater than the assessment value.

2. The electrically driven vehicle according to claim 1, further comprising:
a load sensor for detecting the load of the vehicle;
wherein adjustments are made so that the amount of torque of the at least one electric motor to be restored over a predetermined period of time decreases with an increase in the load.

3. The electrically driven vehicle according to claim 1, further comprising:
a displacement sensor for detecting the vertical displacement of a suspension attached to a wheel of the vehicle;
wherein the pitching detection means detects the amplitude of pitching vibration in accordance with the displacement of the suspension.

4. The electrically driven vehicle according to claim 1, further comprising:
a pressure sensor for detecting the strut pressure of a suspension attached to a wheel of the vehicle;
wherein the pitching detection means detects the amplitude of pitching vibration in accordance with the strut pressure.

5. The electrically driven vehicle according to claim 1, further comprising:

a speed sensor for detecting a wheel speed of the vehicle;

wherein the pitching detection means detects the amplitude of pitching vibration in accordance with the wheel speed.

6. An electrically driven vehicle comprising:

electric motors;

drive wheels driven by the electric motors respectively;

electric motor control means that, when at least one of the drive wheels slips, reduces the torque of at least one of the electric motors that drives the at least one wheel slipped, and that restores the torque of the at least one electric motor when the slippage is stopped; and pitching detection means that detects the amplitude of pitching vibration to which the vehicle is subjected, wherein the amount of torque of the at least one electric motor to be restored by the electric motor control means over a predetermined period of time after the slippage is stopped varies depending on whether or not the amplitude detected by the pitching detection means is greater than an assessment value, wherein, when the amplitude detected by the pitching detection means is greater than the assessment value, the electric motor control means stops restoring the torque of the at least one electric motor.

7. An electrically driven vehicle comprising:

electric motors;

drive wheels driven by the electric motors respectively;

electric motor control means that, when at least one of the drive wheels slips, reduces the torque of at least one of the electric motors that drives the at least one wheel slipped, and that restores the torque of the at least one electric motor when the slippage is stopped; and pitching detection means that detects the amplitude of pitching vibration to which the vehicle is subjected, wherein the amount of torque of the at least one electric motor to be restored by the electric motor control means over a predetermined period of time after the slippage is stopped varies depending on whether or not the amplitude detected by the pitching detection means is greater than an assessment value, wherein, when the amplitude detected by the pitching detection means is greater than the assessment value, the electric motor control means keeps the torque of the electric motor unchanged for a fixed period of time when the torque of the at least one electric motor is restored.

* * * * *